United States Patent [19]

Ewan et al.

[11] 4,141,701
[45] Feb. 27, 1979

[54] APPARATUS AND PROCESS FOR THE REMOVAL OF POLLUTANT MATERIAL FROM GAS STREAMS

[75] Inventors: Thomas K. Ewan, Daingerfield; Malley R. Bass, Longview; Jennings D. Means, Gilmer; James L. Frier, Longview; Orvis L. Holland, Linden, all of Tex.

[73] Assignee: Lone Star Steel Company, Dallas, Tex.

[21] Appl. No.: 737,724

[22] Filed: Nov. 1, 1976

Related U.S. Application Data

[63] Continuation-in-part of Ser. No. 636,318, Nov. 28, 1975, abandoned.

[51] Int. Cl.$^2$ .................. B01D 45/00; B01D 47/10
[52] U.S. Cl. .................................. 55/90; 55/94;
55/263; 55/437; 55/257 NP; 55/462; 55/468;
261/62; 261/78 A; 261/116; 261/118;
261/DIG. 54; 261/DIG. 76
[58] Field of Search .............. 55/84, 220, 235, 237,
55/238, 257 R, 437, 468, 90, 94, 257 MP, 263,
462; 261/DIG. 54, DIG. 9, 17, 62, 78 A, 115,
116, 118, DIG. 76

[56] References Cited

U.S. PATENT DOCUMENTS

| 467,264 | 1/1892 | Raymond | 55/92 |
|---|---|---|---|
| 605,280 | 6/1898 | Green | 261/116 |
| 798,287 | 8/1905 | Lawton et al. | 261/7 |
| 2,579,282 | 12/1951 | Vicard | 55/257 R |
| 2,604,185 | 7/1952 | Johnstone et al. | 55/237 X |
| 2,797,904 | 7/1957 | Voorheis | 261/78 A X |
| 2,914,941 | 12/1959 | Frenzl | 73/147 |
| 2,964,304 | 12/1960 | Rice | 261/DIG. 54 X |
| 3,049,005 | 8/1962 | Frenzl | 73/147 |
| 3,106,459 | 10/1963 | Osgood et al. | 261/DIG. 54 X |
| 3,367,402 | 2/1968 | Cross, Jr. et al. | 261/116 X |
| 3,385,030 | 5/1968 | Letvin | 55/90 |
| 3,456,928 | 7/1969 | Selway | 261/DIG. 54 X |
| 3,490,204 | 1/1970 | Kalika | 55/94 |
| 3,567,194 | 3/1971 | Shah et al. | 261/118 |
| 3,582,050 | 6/1971 | Kozak | 261/36 |
| 3,608,274 | 9/1971 | Stingelin et al. | 55/84 |
| 3,613,333 | 10/1971 | Gardenier | 55/94 X |
| 3,704,570 | 12/1972 | Gardenier | 55/84 |
| 3,782,074 | 1/1974 | Gardenier | 55/94 X |
| 3,812,656 | 5/1974 | Barnhart | 55/220 |
| 3,852,408 | 12/1974 | Martin et al. | 423/242 |
| 3,852,409 | 12/1974 | Martin et al. | 55/238 X |
| 3,894,851 | 7/1975 | Gorman | 55/94 |
| 3,898,308 | 8/1975 | Baum | 261/DIG. 54 X |
| 3,912,469 | 10/1975 | Ewan et al. | 261/116 X |
| 3,966,438 | 6/1976 | Nicholson | 261/DIG. 9 X |

FOREIGN PATENT DOCUMENTS

| 565839 | 7/1960 | Belgium | 55/94 |
|---|---|---|---|
| 280088 | 9/1913 | Fed. Rep. of Germany. | |
| 764429 | 12/1956 | United Kingdom | 261/118 |
| 881437 | 11/1961 | United Kingdom. | |
| 925711 | 5/1963 | United Kingdom | 261/118 |
| 1227499 | 4/1971 | United Kingdom. | |

OTHER PUBLICATIONS

Frenzl, O. "Hot-Water Ejector for Engine Test Facilities", *Journal of Spacecraft*, 1(3): pp. 333-338, May-Jun., 1964.

Harris, L. S., "Fume Scrubbing with the Ejector Venturi System", *Chem. Eng. Progress*, 62(4): pp. 55-59, Apr., 1966.

Willet, H. P., et al., "The Venturi Scrubber for Cleaning Oxygen Steel Process Gases", *Iron and Steel Engineer*, pp. 126-131, Jul., 1961.

*Primary Examiner*—Frank W. Lutter
*Assistant Examiner*—Kathleen J. Prunner
*Attorney, Agent, or Firm*—Donald E. Degling

[57] ABSTRACT

A process and apparatus is disclosed for the removal of pollutant material including solid or liquid particulate matter and gaseous pollutants from gas streams in which the gas is driven through a mixing tube by forming a jet of a compressible fluid such as steam or air or the whole or a part of the polluted gas itself. In some instances the jet acts as an ejector to induce flow of the polluted gas into the mixing tube but when all of the polluted gas is formed into a jet it is directed into the mixing tube without any ejector action. A mechanically atomized liquid is introduced into the outer region of the jet of compressible fluid emerging from the nozzle in which the jet is formed. The mechanically atomized liquid is further atomized by the shearing action of the jet to form high velocity droplets which are intimately and turbulently mixed with the pollutant-containing gas and retained in the mixing tube for a sufficient time so that the pollutants become entrained with the water droplets. The turbulent mixture is then directed into a diffuser having an increasing cross-sectional area and deflected as it enters the diffuser away from one portion of the interior surface of the diffuser and toward an opposite portion of the interior surface of the diffuser and also decelerated so as to cause a separation in the flow of the liquid and non-liquid constituents of the mixture. Apparatus is disclosed including a compressible fluid nozzle for forming the jet and a liquid injector, a mixing tube, a diffuser, and fluid and mechanical separating means whereby a separate flow of the particulate material including submicronic sized particulate entrained in liquid droplets is established in the diffuser for removal from the cleaned gas stream. If it is desired to remove reactive gaseous pollutants from a gas stream, appropriate chemical reagents may be added to the injected liquid or directly to the gas stream prior to treatment.

24 Claims, 40 Drawing Figures

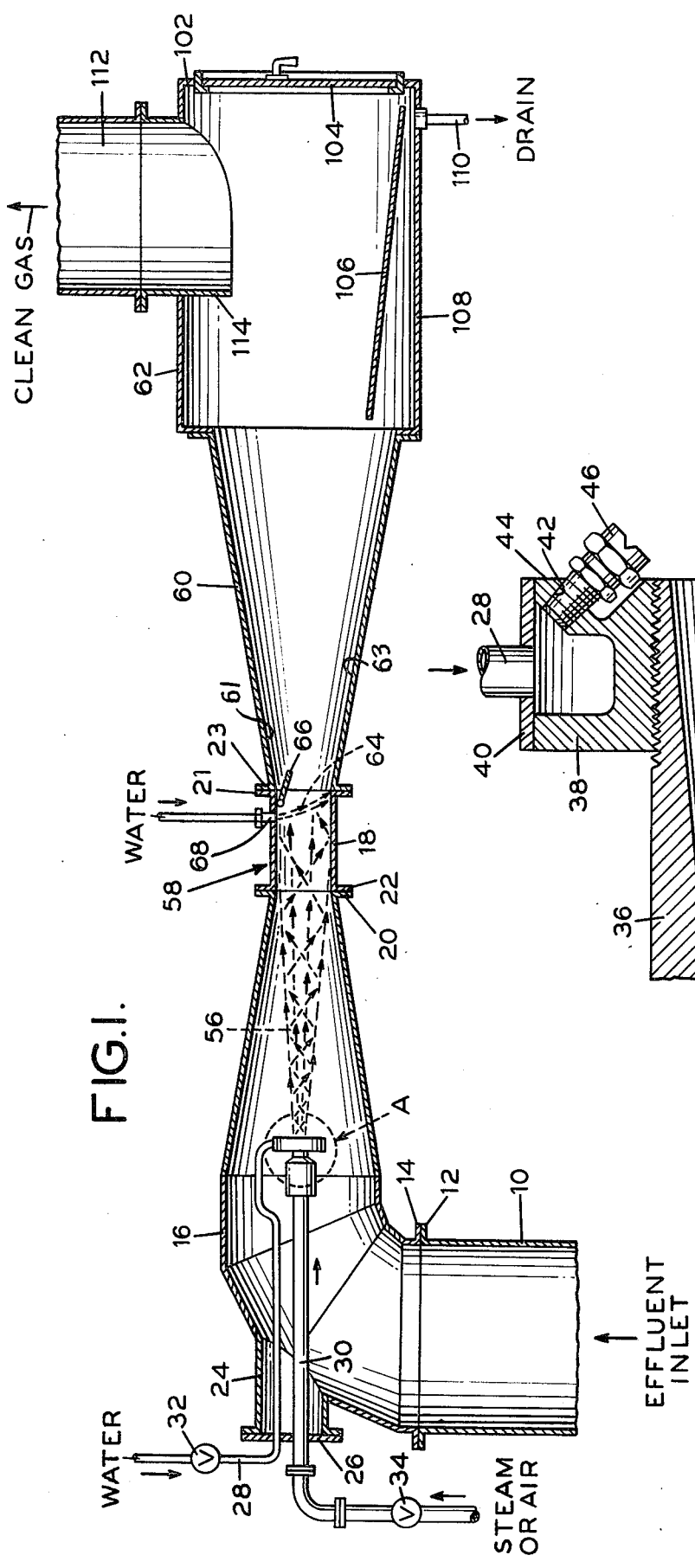
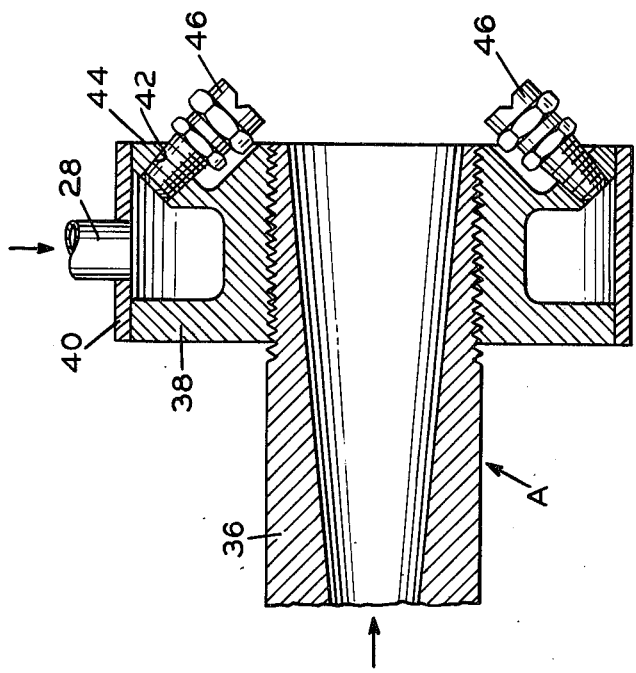
FIG.1.
FIG.2.

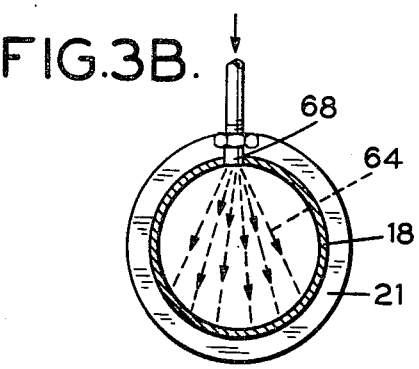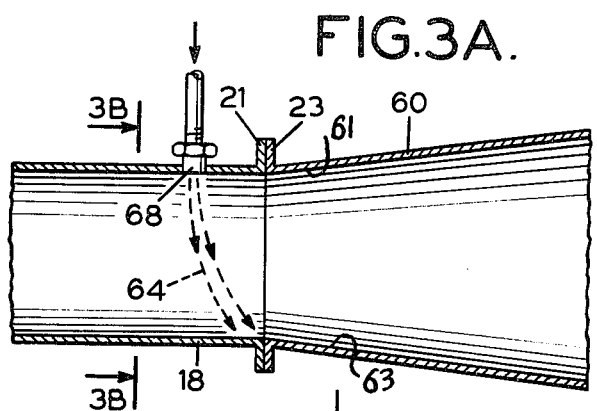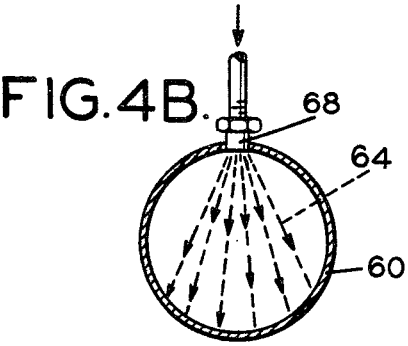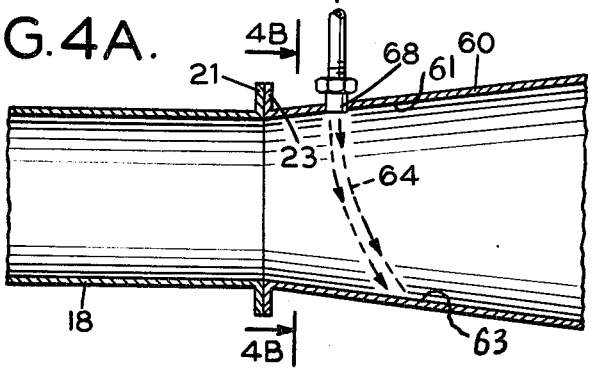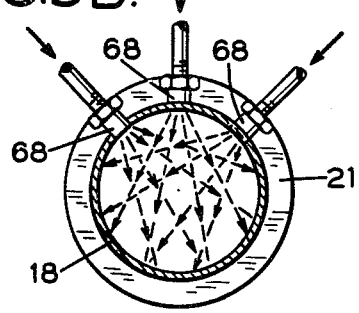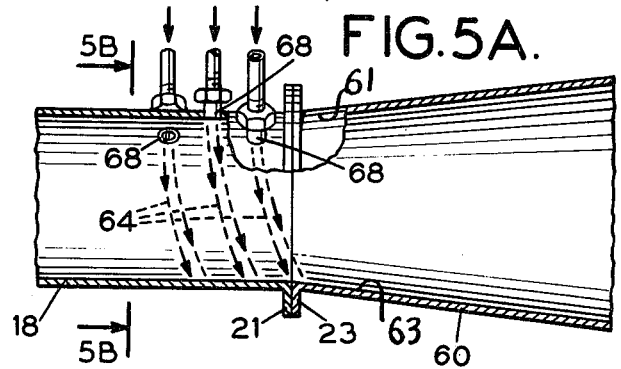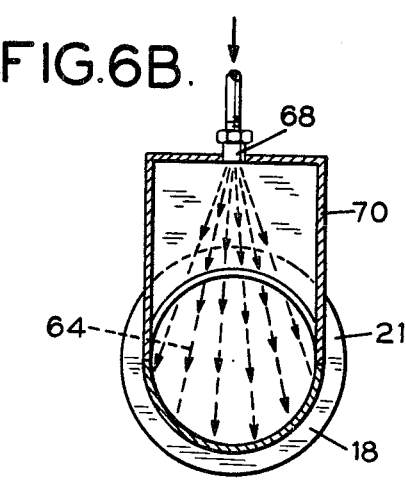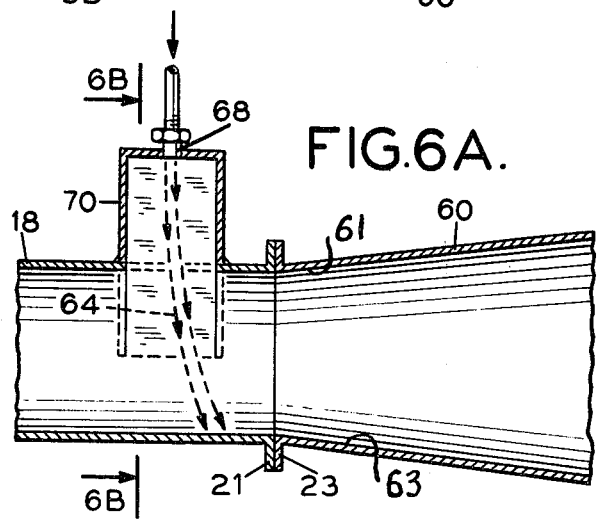

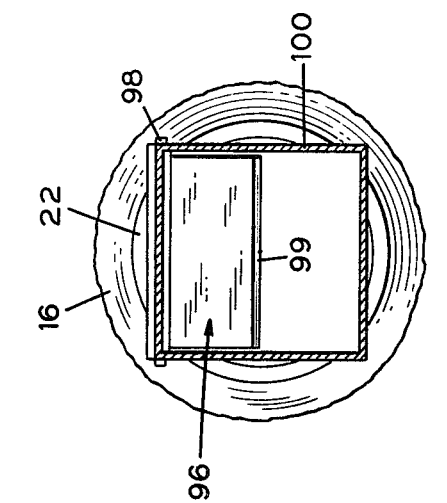
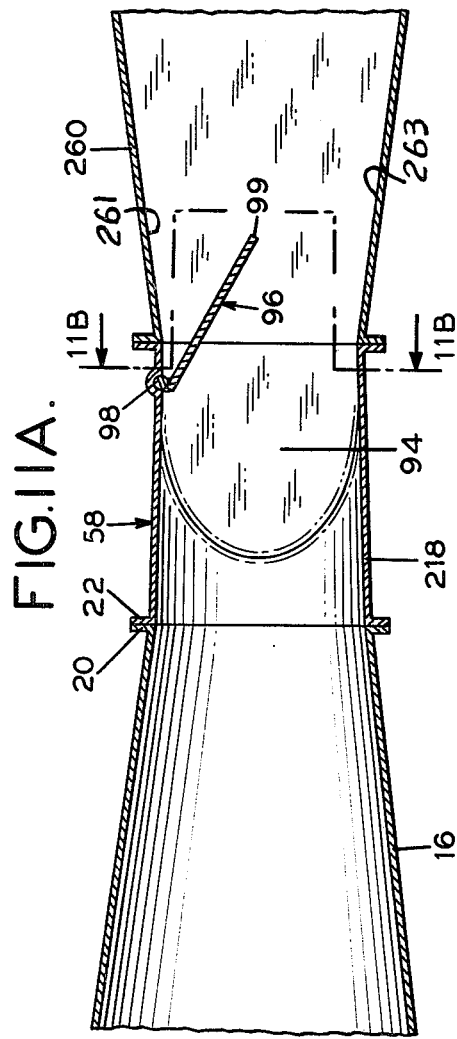
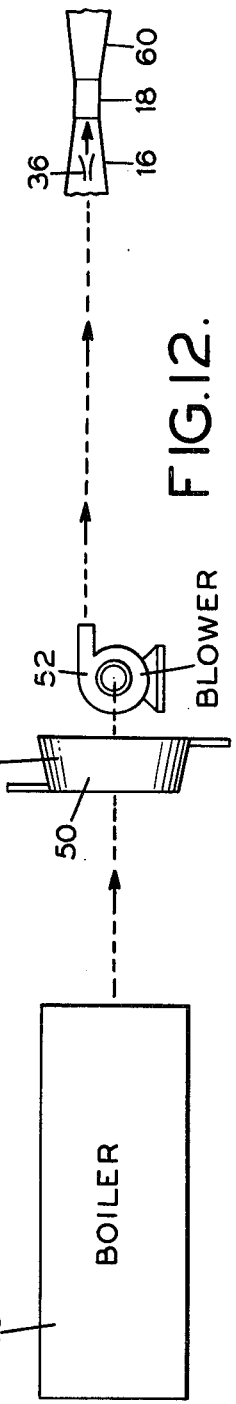

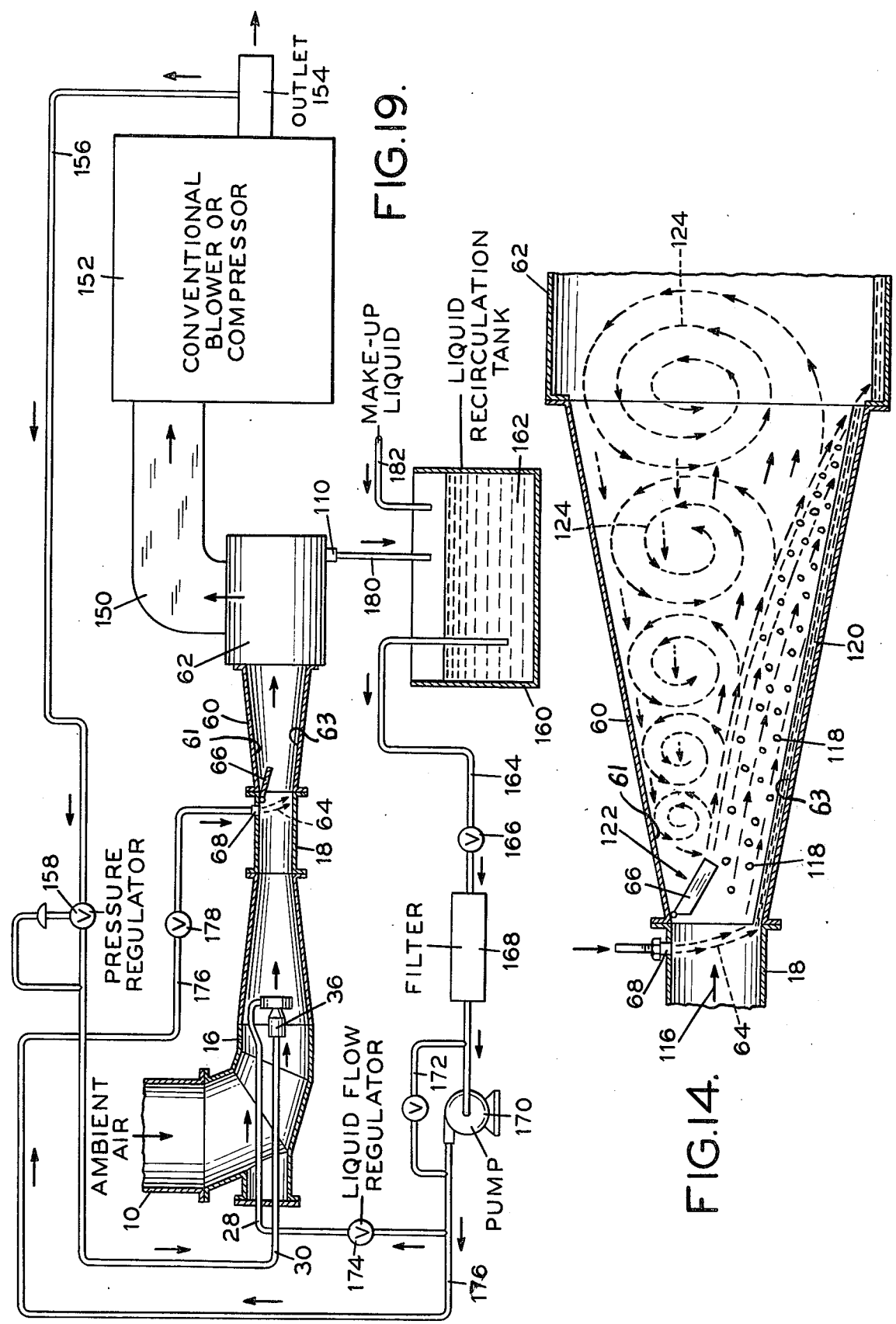

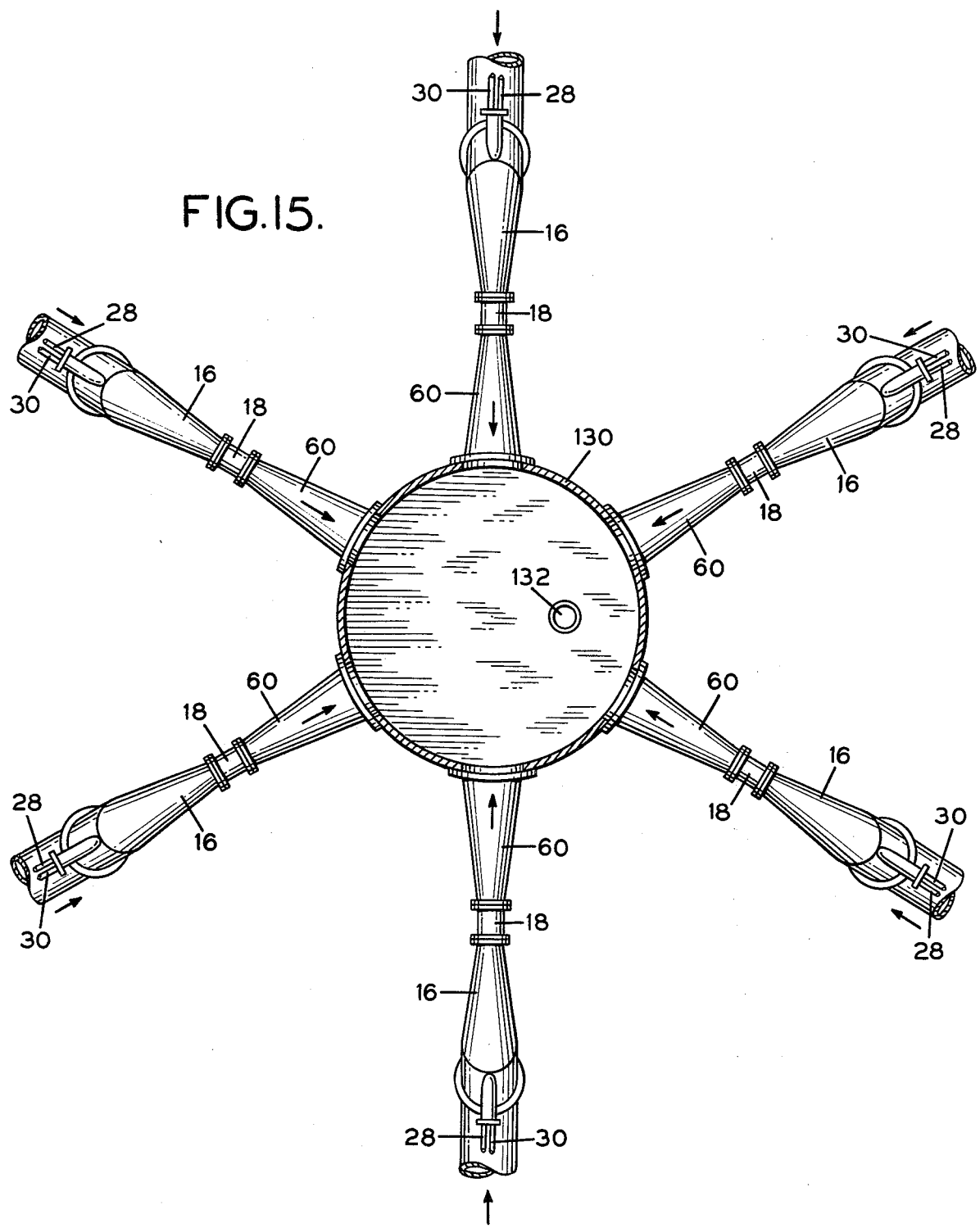

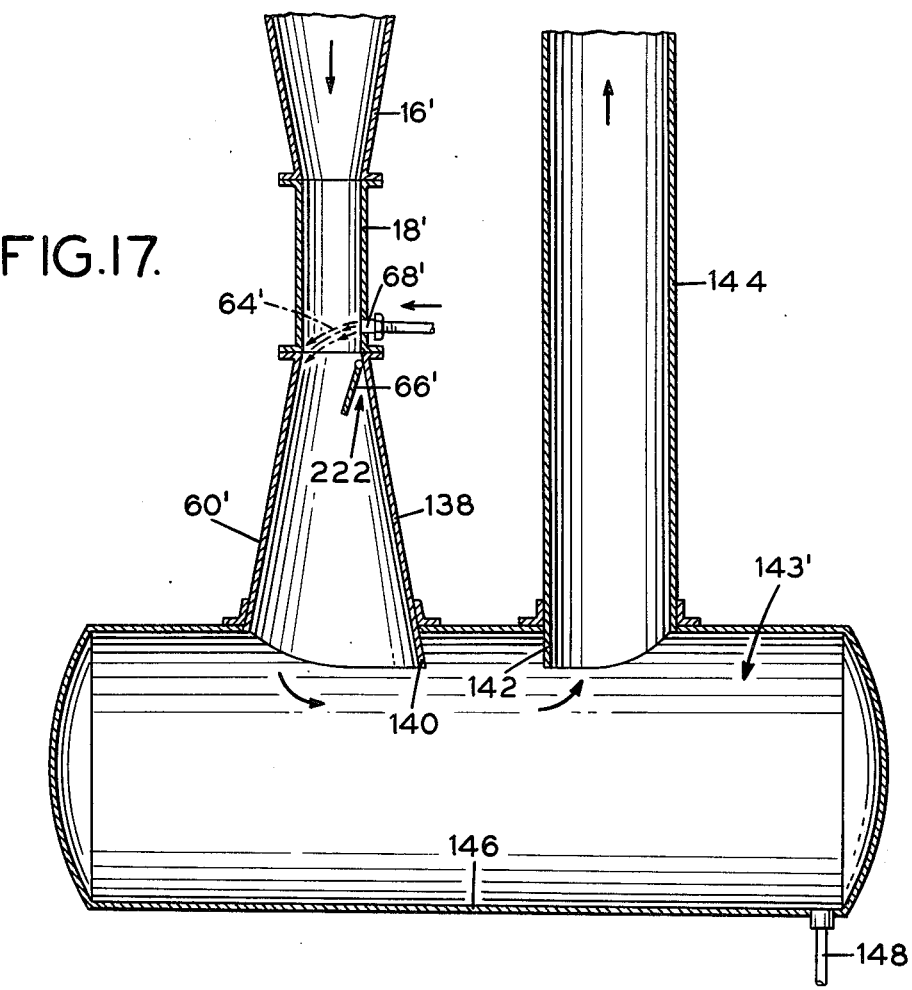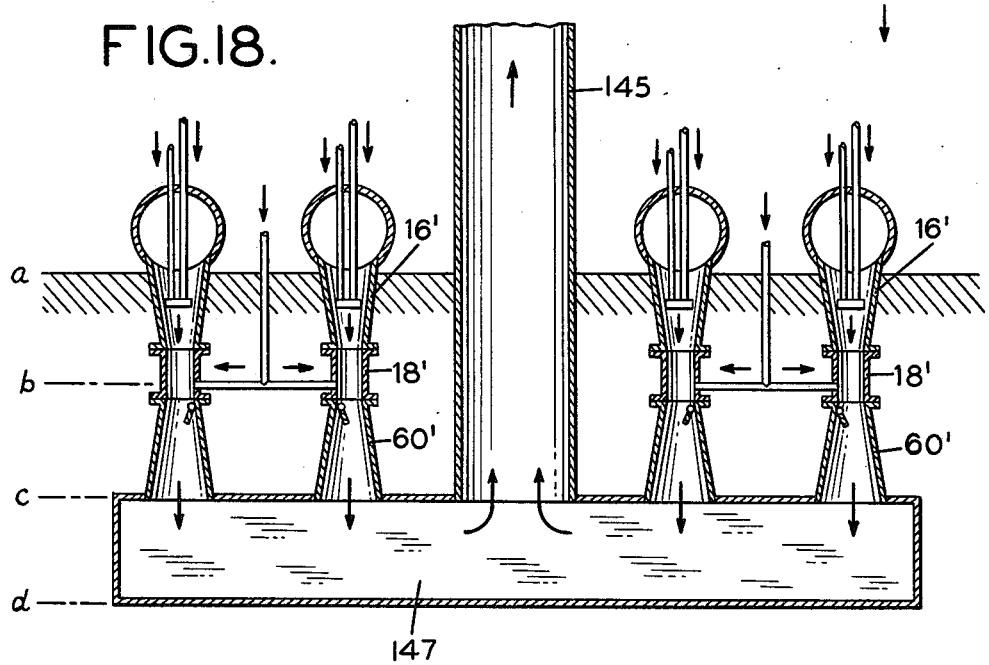

EFFECT OF PARTICULATE WETTABILITY

EFFECT OF PARTICULATE DENSITY

EFFECT OF PARTICULATE SIZE

EFFECT OF PARTICULATE LOADING

EFFECT OF OUTLET TEMPERATURE

EFFECT OF DRIVING FLUID PRESSURE

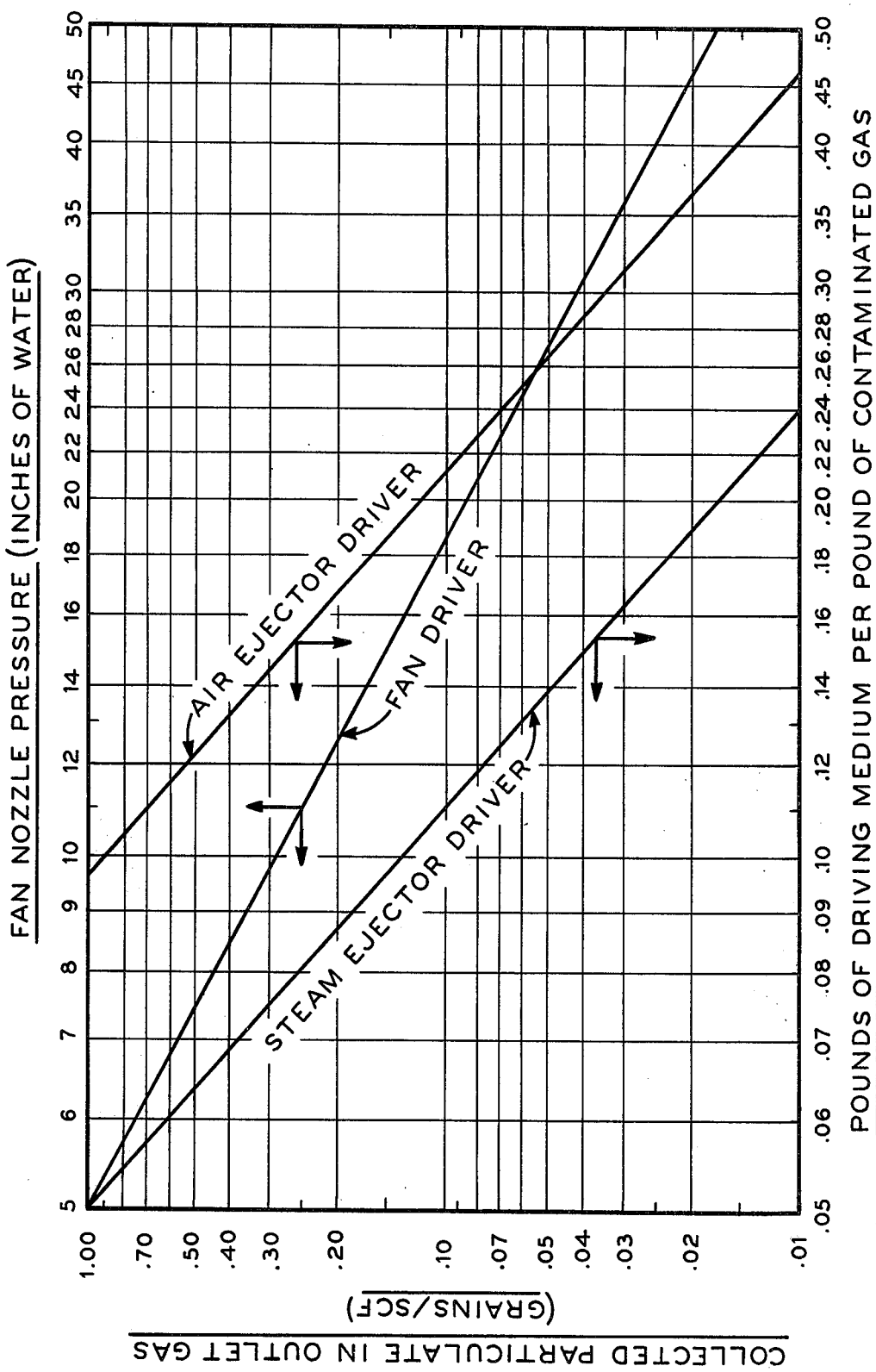

APPARATUS AND PROCESS FOR THE REMOVAL OF POLLUTANT MATERIAL FROM GAS STREAMS

This application is a Continuation-In-Part of U.S. application Ser. No. 636,318, now abandoned, filed Nov. 28, 1975 by applicants herein.

BACKGROUND OF THE INVENTION

1. Field of the Invention

This invention relates to the field of air pollution control and more particularly to the removal of particulate matter and noxious or otherwise objectionable or value-containing gases from gas streams resulting from the operation of various types of processes, including production of heat or power, industrial, chemical, combustion, material handling and other processes.

With the passage by Congress of the Clean Air Act of 1970 and similar legislation by many states and localities both prior to and subsequent to the federal legislation, national attention has been drawn to the problem of improving the ecology or of preventing further deterioration of the quality of the ambient air. Particulate matter, which may comprise solids or liquids, and various gases constitute the principal forms of pollutant material. These pollutants may be found in the gaseous effluent of, or may be generated as a by-product pollutant in, many processes. While industrial operations are an obvious source of much of the pollutants to be found in the air, additional sources include transport vehicles, such as automobiles, trucks, railroads, ships and aircraft and non-industrial operations, such as apartment houses and private dwellings, which may use coal or oil for heating or waste disposal purposes.

The pollutants found in the air may vary widely in form, size and chemical nature. For example, the particulate matter may be liquids or solids which, in turn, may be chemically active or inert. The particles may vary in size from substantially smaller than 0.01 micron up to a fraction of an inch and may include metal or mineral values of economic significance. The gaseous pollutants may be relatively innocuous gases, such as carbon dioxide, or highly toxic gases including gases such as hydrogen sulfide, sulfur dioxide, carbon monoxide, or various of the nitrogen oxides. Some of the gaseous pollutants may be further reacted in the atmosphere to form acids or other substances which may have deleterious effects on the environment.

Up to the present time, the principal effort in the control of air pollution has been directed at source control of particulates whereby the weight of the particulate emitted from a particular source, e.g. the stack of an industrial plant, has been limited to some small fraction of the weight of the total particulate emitted from the process being controlled. Although it has been possible on many occasions to obtain the desired level of emission on a weight or weight concentration basis, environmentalists have become aware that the quality of the ambient air has not improved and, frequently, there has been a degradation in the ambient conditions. This result may be explained in part by the fact that many sources of pollution, e.g. vehicles and residences, are controlled inadequately, if at all, so that an unacceptable quantity of pollutants is being discharged into the atmosphere.

However, another explanation of the continued high level of pollutants in the atmosphere is now available. It is known that, if particulate is large enough, it will settle out quickly under gravitational forces and will not produce a major air pollution problem except in the immediate vicinity of the point of emission. But, as the particulate becomes smaller, the residence time in the atmosphere increases greatly so that some submicronic-sized particulate may remain in the atmosphere for years. Such submicronic particulate, though constituting only a very small portion of the total weight of the emission, may represent the vast majority of the number of particles emitted and also may represent the vast majority of the total toxic material emitted. Thus, the contribution of the submicronic particulate to the degradation of the ambient atmosphere is disproportionate to its relatively small weight. As recognition of this effect grows, it is expected that legislatures and other control agencies will place greater emphasis on the removal of fine particulate.

In the past few years, the developing shortage of fuels, such as natural gas, low-sulfur coal and fuel oil, has caused an increased concern in the control of noxious gases and particularly sulfur dioxide since the substitution of fuels containing larger amounts of sulfur exacerbate the pre-existing problems of controlling sulfur dioxide and other sulfur containing effluents. An example of the effect of small amounts of sulfur dioxide in the ambient air (in the range of 40–100 parts per million) appears in the operation of commercial blowers or air compressors. Recent experience has shown increased maintenance costs due to the attack on bearings and other wearing surfaces by sulfuric acid formed from the sulfur dioxide contained in the air drawn through the blower. Existing equipment is technically and economically ineffective to control adequately these levels of pollution in the ambient air.

Another effect of the recent fuel shortage has been an escalation in the cost of fuels and particularly in the cost of low-sulfur fuels. The result has been an abrupt increase in the cost of energy in the form of electrical power, steam and compressed air. As the amount of energy required for pollution control equipment varies with the type of equipment, the increased energy costs have modified the competitive advantages of the various types of equipment available on the market. It is becoming increasingly apparent, however, that there is a great need to develop equipment and processes which are capable of removing pollutants, including very fine particulates and sulfur-containing gases, from gas streams with the expenditure of a minimum amount of energy. In addition, it is apparent that it is important to remove such pollutants at a minimum total annual cost to the user. This means that consideration should be given to the capital cost of equipment (amortized over the expected life of the equipment), the annual operating costs, particularly labor and energy costs, and the annual cost of maintaining the equipment.

2. Description of the Prior Art

The art has developed a number of different types of equipment over the years designed to remove particulate from gas streams, which equipment may be categorized in several ways.

One category of such equipment is fabric filters. In the filter separator a screen having interstitial openings of any desired size is placed as a barrier to the flow of the particulate-containing gas stream. A common form of the filter separator is known as a bag-house which comprises a large number of fabric bags of felt or woven fabrics having a fine mesh to trap the particulate from the gas stream. While the bag-house separator is one of the most effective of the prior art devices for the removal of fine particulate, it has several inherent disadvantages which prevent its adoption for many processes. First, the bag-house is a relatively large installation and may employ several thousand fabric bags. As a result of its complexity, the bag-house is expensive to install and maintenance and operating costs are high due to the necessity for frequent cleaning and replacement of the bags. Secondly, the operating temperature is limited by the nature of the fabric material so that cooling of the gases to be treated is frequently necessary. Finally, while the bag-house is quite effective for particulate removal down to a size of about 1 micron, it is not well adapted to the removal of pollutants such as sulfur dioxide where some type of chemical reaction is necessary nor to the removal of particles below 1.0 micron in size which may be found in fumes and smog.

Another commonly used device is the mechanical separator, the so-called cyclone or centrifugal separator. In this apparatus the particulate-containing gas is generally introduced tangentially into a cylindrical or conical vessel and, as the direction of the gas stream is changed, the particulate is separated therefrom. While the cyclone is effective for large particulate which will readily separate from a gas stream due to gravitational or inertial forces, its efficiency decreases with smaller particulate and becomes largely ineffective with respect to particulate which is less than about 10 microns in size. Also, the energy requirements of the cyclone are proportional to the pressure drop through the cyclone and increase rapidly as the particulate decreases in size.

A third category of gas cleaning equipment includes the precipitator which employs electrostatic forces. In this device, a particulate-containing gas stream is charged to one polarity and is then passed between oppositely charged plates which, in turn, attract the particulate. The particulate may then be removed by mechanical means. The electrostatic precipitator becomes largely ineffective for particulate less than about 2 to 3 microns in size. In addition to relatively high capital costs, the precipitator is expensive to operate and its performance tends to deteriorate in time. Where the effluent gas contains combustible material there may also be safety hazards which inhibit the use of the precipitator. Other inadequacies of the precipitator include the inability to remove sulfur dioxide and sensitivity to particulate resistivity.

Some separation may result from the action of gravitational forces though, in the above equipment, these forces were not intentionally exploited. Thus, if desired, a particulate-containing gas stream may be introduced into a large settling or stilling chamber where the velocity is reduced essentially to zero. Again, this device is most effective for large particulate. As the particulate becomes smaller, the time required for settling increases.

Although most of the equipment referred to above is of the dry type, wet separation equipment is also available. A simple type of wet scrubber is the spray chamber or atomizer wherein the particulate-containing gas is sprayed with a liquid to wet and capture the particulate. See, for example, the early U.S. Pat. Nos. 467,264, 605,280 and 798,287. Basically, the wet scrubber removes particulate by a process of collision between liquid droplets and particles. In order to increase the probability of such collisions, the number of droplets available for collision and the relative velocities of the particle and droplet should be maximized. Recognition of this fact led to the development of the venturi scrubber wherein the particulate-containing gas was accelerated to a high velocity in a venturi tube and the water injected through spray nozzles located in or adjacent to the throat portion of the venturi. Recent examples of such venturi scrubbers are shown in U.S. Pat. Nos. 3,490,204, 3,567,194, 3,582,050 and 3,812,656. Normally, the particulate-containing gas is driven through the venturi by fans, blowers or ejectors which may be located either upstream or downstream from the venturi scrubber. Many forms of the venturi scrubber exist, characterized by differences in the way in which the liquid is introduced into the gas stream. An example of the combination of a spray chamber with a venturi is shown in U.S. Pat. No. 2,579,282.

In each of the above types of air pollution control devices, it is necessary to provide fans or blowers to drive the contaminated gas through the system.

In the venturi jet scrubber, the motive force is provided by a cold water ejector mounted generally on the axis of the converging section of the venturi and no additional fans or blowers are required. Water is pumped through the ejector nozzle where it is broken up or atomized into droplets which are then mixed with the gas. Driving is accomplished by an exchange of momentum between the driving water and the driven gas and, simultaneously, the particulate in the gas is removed by collision or impaction with the water droplets. A venturi jet scrubber of the type here described has long been available from the Koertrol Corporation and is designated as the "Type 7010" scrubber. Additional examples of venturi jet scrubbers are shown in British Pat. Nos. 1,227,499 and 881,437, German Pat. No. 280,088 and U.S. Pat. No. 3,385,030. However, as with the other scrubbing devices referred to above, the effectiveness of the venturi jet scrubber drops as the particle size falls below 2 microns and particularly as the size falls below 1 micron. Thus, where it is necessary to maintain a high cleaning efficiency with respect to fine particulate, even the venturi jet scrubber is inadequate.

As pointed out above, in order to increase the cleaning efficiency with respect to fine particulate, it is necessary to increase the flow of water, decrease the droplet size, increase the number of available droplets, increase the relative velocity between the droplets and the gas or some combination of these factors. Each of the above alternatives, which requires an increase in the input energy, has been applied, in one form or another, to produce a high-energy wet scrubber.

The use of hot water under high pressure to form a hot water ejector was first applied as a drive for wind tunnels (see U.S. Pat. Nos. 2,914,941 and 3,049,005). Later, the hotwater drive was applied to test stands for jet engine testing (see O. Frenzl "Hot-Water Ejector for Engine Test Facilities," Journal of Spacecraft, May-June 1964, Vol. 1, No. 3, pp. 333–338). In both of these applications particulate contained in the air or in the combustion products from the jet engines was removed along with the water from the system.

More recent developments in the art of pollution control equipment have demonstrated the feasibility of combining into a system various of the particulate control devices described above. See, for example, U.S. Pat. No. 3,894,851. Thus, it has been common to use a spray chamber followed by a cyclone separator or a venturi scrubber; a venturi jet scrubber followed by a separator; or two venturi jet scrubbers followed by a separator. A scrubber system of the latter type is described in an article by L. S. Harris entitled "Fume Scrubbing With the Ejector Venturi System" (Chemical Engineering Process, Vol. 62, No. 4, pp. 55-59, April 1966). A system employing a quenching chamber, a venturi scrubber and a spray cooling tower is described in an article by Willet and Pike entitled "The Venturi Scrubber for Cleaning Oxygen Steel Process Gases" (Iron and Steel Engineer, July 1961, pp. 126-131). As shown in that publication, a pressure drop in the venturi of 50 to 60 inches of water was required to attain cleaning levels of 0.02 to 0.03 grains per standard cubic foot of dry gas. The combination of a hot water drive with a cyclone separator as an air pollution control system where hot water in its liquid state is both the source of the driving energy and the cleaning medium is also shown in U.S. Pat. Nos. 3,613,333, 3,704,570 and 3,782,074.

U.S. Pat. No. 3,852,408 issued to applicants' assignee discloses a process for removing particulate and gaseous sulfur dioxide in an apparatus comprising a spray chamber for conditioning the contaminated gas and removing large particulate, a hot-water drive and chemical injection unit for driving the gas and capturing the remaining particulate and the sulfur dioxide reaction products in water droplets, and a cyclone separator for separating the water droplets and sulfur dioxide reaction products from the cleaned gas.

Although the process described in U.S. Pat. No. 3,852,408 is effective to remove both particulate matter and sulfur dioxide in a single system to levels not heretofore possible, difficulties were experienced in handling, on a continuous basis, hot water at high pressures. Furthermore, the cost of heating and treating the required water (i.e. 0.3 to 0.5 lb. water per lb. of contaminated gas) is substantial even though these costs are lower than those of alternative systems. Further development led to the concept of separating the driving and cleaning functions. The driving function was performed by a steam or air ejector, while the cleaning function was performed by atomized water (which could be unheated and untreated). This improved process is disclosed in U.S. Pat. No. 3,852,409, also issued to applicants' assignee. The process of U.S. Pat. No. 3,852,409 simplified the process of removing either particulate or sulfur dioxide or both from a contaminated gas stream by eliminating the use of hot water which was difficult to handle. The new process also was more efficient since, among other things, there were substantially reduced requirements for water heating and treating.

Since the development in the early 1970's of the processes disclosed in U.S. Pat. Nos. 3,852,408 and 3,852,409, the cost of energy, particularly in the form of steam, has increased greatly while the ambient air standards have tended to become even more restrictive. It is, therefore, a principal object of the present invention to provide an apparatus for removing pollutants from a contaminated gas stream or the ambient air with a minimum consumption of energy. Another object of the invention is to provide a system in which either particulates or particulates and gaseous pollutants may be removed from a contaminated gas stream. A further object of the invention is to provide a system capable of handling efficiently wide variations in the flow of a contaminated gas stream by the use, in some circumstances, of a modular construction. A still further object of the invention is to provide a simplified system for the removal of particulates and gaseous pollutants from a contaminated gas stream.

SUMMARY OF THE INVENTION

The present invention relates to an improved process and apparatus for removing particulate or particulate and gaseous pollutants from a contaminated gas stream.

In accordance with the present invention, the contaminated gas stream is driven through a mixing tube means either by a compressible fluid ejector, which may be either a steam ejector or an air (or other compressible fluid including the contaminated gas itself) ejector, or when the whole stream of contaminated gas is formed into a jet such jet is directed into the mixing tube without secondary gas flow. As will be explained in more detail below, the induction and driving function alternatively may be performed by separately powered fans or blowers. Where particulate only is involved, the cleaning function may be provided by specially atomized water droplets. The cleaning water need not be treated or heated and preferably may be ordinary mill water or water recycled from the system. In order to provide droplets properly sized to capture particulate in the submicron size range, the water is first mechanically atomized in atomizing nozzles to an intermediate size and then further atomized by injection into the jet of steam, air, contaminated gas or other compressible fluid emerging at high speed from a nozzle. In addition to the formation of high speed water droplets for impaction, a series of shock waves to provide positive mixing and contact is established when the compressible fluid is driven through the jet under such pressure as to emerge at supersonic speeds.

Where, in addition to particulate, the contaminated gas stream contains gases which it is desired to remove, such as sulfur dioxide, hydrogen sulfide or similar pollutants, chemical reagents, such as lime, ammonia, sodium hydroxide or combinations of these, or other reagents may be added to the cleaning water as described in U.S. Pat. No. 3,852,408.

In certain circumstances it may be desirable to precondition the contaminated gas stream in advance of the jet-forming nozzle and water injector device. Such preconditioning may be provided in a conditioning chamber where the contaminated gas may be contacted by liquid sprays, preferably in counterflow arrangement, under conditions where the gas flow is at a low velocity. The conditioning chamber will ordinarily remove a portion of the larger particulate while at the same time wetting at least some of the smaller particulate so as to insure that substantially all of the remaining particulate will be wetted and captured in subsequent portions of the apparatus. The conditioning chamber (or the ducts leading to it) also provides a convenient location for the introduction of chemicals such as gaseous or liquid ammonia which may be desired for the elimination of certain pollutants.

In accordance with the present invention, the emerging jet from the ejector-injector device with the induced flow of contaminated gas or the jet of contaminated gas, when the whole of the gas stream is formed into a jet, is directed into a mixing tube, preferably of circular cross section. When the ejector-injector device is used the mixing tube cooperates with the emerging jet to form an effective ejector pump and a mixing zone by which the contaminated gas is pumped through the system and the particulate contained in the gas is captured by the atomized droplets formed from the cleaning liquid. When all of the contaminated gas is formed into a jet the cleaning liquid is injected into the jet and the mixture of gas and atomized liquid is further mixed in the mixing tube to cause capture of the particulate in the same manner. Within and immediately beyond the mixing zone, the liquid droplets containing the particulate and, if present, the reaction products resulting from the chemical reaction between the gaseous and liquid pollutants and the injected chemicals, continue to grow and coalesce into larger droplets by collision, condensation or nucleation. During the passage through the mixing tube, the velocity of the droplets decreases and gravitational forces tend to cause the droplets to fall toward the bottom surface of the mixing tube — both processes being effective to begin the separation of cleansed effluent gases from the now contaminated water droplets. For the purposes of the present invention, the mixing tube needs only to be sufficient in length to assure hook up of the driving jet and the contaminated gas to achieve effective pumping over a reasonably wide range of operating conditions or to achieve adequate mixing and particulate capture when all of the contaminated gas is formed into a jet. Unlike said U.S. Pat. No. 3,852,409, wherein the mixing tube is elongated to assure very extensive growth of droplet size, the present invention utilizes the mixing tube for pumping and mixing and the changes in velocity and droplet size occur principally beyond the mixing tube.

Immediately following the mixing tube, applicants provide a specially designed diffuser chamber in which the mixture of gas and water droplets is decelerated and separated into a clean gas stream and a liquid stream. The diffuser basically is a chamber of expanding cross sectional area as is customary although the rate of expansion of cross section is preferably somewhat greater than is customary when maximum pressure recovery is desired, for example in a conventional venturi scrubber. The liquid stream is formed by the further coalescence within the diffuser of a large number of small droplets which grow to larger droplets and then fall together to form the stream. The diffuser is specially adapted to induce a flow separation from one region of the diffuser wall and thus differs from the usual diffuser which is designed to avoid flow separation in order to convert the velocity head of the gas to a pressure head, i.e. to obtain maximum pressure recovery. Applicants provide separating means adjacent the inlet of the diffuser to deflect the mixture flowing from the mixing tube away from the wall portion of the diffuser thus to induce a localized flow separation between gaseous and liquid components of the mixture. The separating means may comprise a fluid flow separator, utilizing a gas or a liquid, a mechanical separator, or both. Such separating means functions to start the water droplets moving in a path away from one portion of the diverging inner surface of the diffuser and the region in which the localized flow separating is to be induced toward the diverging inner surface of an opposite wall portion of the diffuser, while simultaneously providing an obstruction which induces a low pressure region downstream of the separating means to cause such flow separation. By redirecting the flow of the droplets toward the inner surface of an opposite diffuser wall portion and away from the exit of the diffuser, the turning radius of the droplets toward the exit is effectively sharpened and, once started in the direction the droplets will tend to continue therein. The combination of decreased velocity and sharpened turning radius further enhances separation of the liquid droplets from the gas. Within the diffuser, the region of separated flow is characterized by low pressure and turbulence which, in turn, causes a reverse flow of gas and any still entrained water droplets toward the lowest pressure zone of that region. The droplets which are too small to separate readily from the gas stream remain entrained in the reversely flowing turbulent gas and thus are returned toward the entry end of the diffuser. The additional residence time of these small droplets in the turbulent low pressure region of the diffuser permits further growth by impaction, condensation, or coalescence until a droplet size is obtained which insures separation by gravity effects. It will be appreciated that applicants' diffuser obtains somewhat less than full pressure recovery but a sufficient recovery is obtained to minimize the energy required to operate the system. In contrast, systems employing cyclone separators depend upon a relatively high entering velocity and a pressure drop in excess of 5 inches of water is experienced in the cyclone alone. The mechanical or fluid flow separating means is preferably made adjustable to vary the flow separation effect in order to compensate for variations in the gas flow, particulate loading and degree of cleaning required and to control the operation of the ejector pump. The combined effect of the adjustable separating means and the customary adjustments of pressure or pressure differential under which the jet of compressible fluid is formed and the adjustment of the amount of water or other cleaning liquid injected into the jet, together with the original design of the length, diameter and other dimensions of all parts for handling a suitable range of such variables provides regulation of the mass and velocity of flow of the mixture through the mixing tube.

Within the diffuser, the velocity of the gas is reduced so as to provide sufficient time for the gravitational effect to help the particulate-containing droplets to coalesce and settle out. Separation may be further enhanced by appropriate baffles located in a tailpipe section downstream of the diffuser.

The cleaned gas stream may be released directly from the tailpipe section or, alternatively, may be passed through a stack.

The present invention, as well as further objects and advantages thereof, will be apparent from the following description and accompanying drawings in which:

FIG. 1 is a vertical cross sectional view showing one embodiment of apparatus which may be utilized in the practice of the present invention;

FIG. 2 is an enlarged vertical cross sectional view taken in the area A of FIG. 1 and showing an ejector nozzle with its associated fluid injector;

FIGS. 3A and 3B are, respectively, side and end views, with parts in section, of a fluid flow separating means installed in advance of the diffuser;

FIGS. 4A and 4B are, respectively, side and end views, with parts in section, showing the flow separating means of FIGS. 3A and 3B installed downstream from the mixing tube;

FIGS. 5A and 5B are, respectively, side and end views, with parts in section, illustrating a multi-nozzle fluid flow separating means installed in advance of the diffuser;

FIGS. 6A and 6B are, respectively, side and end views, with parts in section, of an alternate form of a fluid flow separating means;

FIGS. 11A and 11B are, respectively, side and end views, with parts in section, of an adjustable mechanical flow separating device which is also adapted to operate as a damper;

FIG. 12 is a schematic representation of a steam driven air blower for an air ejector drive;

FIG. 13 is a schematic representation of an electrically driven air blower for an air ejector drive;

FIG. 14 is a vertical sectional view showing schematically the nature of the gas and liquid flow within the diffuser in accordance with the present invention;

FIG. 15 is a plan view, with parts in section, illustrating schematically one embodiment of a system of gas cleaning modules of the present invention connected to an existing stack;

FIG. 17 is a vertical sectional view illustrating a gas cleaning device according to the present invention oriented in a vertical direction;

FIG. 18 is a vertical sectional view illustrating schematically an embodiment of a system of vertically oriented gas cleaning modules according to the present invention manifolded to a single stack;

FIG. 19 is a schematic view, with parts in section, showing an apparatus according to the present invention connected to the inlet of a commercial blower or compressor;

FIG. 30 is a family of curves showing the effect of the type of driver for the contaminated gas in apparatus embodying the present invention.

DESCRIPTION OF PREFERRED EMBODIMENTS

Figure 7B:
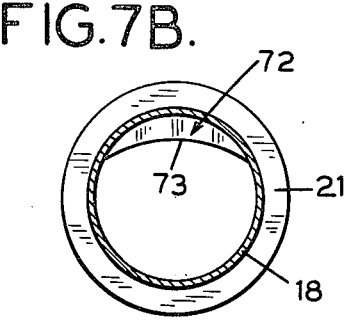
FIGS. 7A and 7B are, respectively, side and end views, with parts in section, of a mechanical separating means located adjacent the entrance to the diffuser.

Referring now to FIG. 1, 10 denotes the duct through which the contaminated gas or effluent to be cleaned enters the system. The inlet duct 10 may be of any convenient size and may be oriented at any angle. In FIG. 1, the inlet duct 10 is oriented vertically with the contaminated gas stream entering the system from below. The inlet duct 10 is provided with a flange 12 which mates with a corresponding flange 14 of a reducing elbow 16. Reducing elbow 16 is specially designed to direct the flow of contaminated gas from the duct 10 to a mixing tube 18 with a minimum loss of pressure head while providing support for the ejector-injector device indicated generally at A in FIG. 1. The reducing elbow 16 may conveniently be connected to the mixing tube 18 through mating flanges 20, 22. On the elbow 16 is positioned a generally cylindrical nipple 24 closed by cover plate 26 and opening into the elbow through which may be passed liquid line 28 and steam, air or other compressible fluid line 30. Regulator valves 32, 34 are placed, respectively, in the liquid line 28 and the steam, air or other compressible fluid line 30 to control the flow therein. The valves 32, 34 may be manually, remotely, or automatically controlled as desired to respond to variations in the nature and quantity of the flow of contaminated gas.

The ejector-injector device indicated at A in FIG. 1, is shown in enlarged scale in FIG. 2. The compressible fluid line 30 terminates in an ejector nozzle 36. The ejector nozzle 36 is designed and proportioned together with the mixing tube 18 to produce a supersonic jet of emerging steam, air or other compressible fluid which will expand as a free jet within the elbow 16 and strike the inner wall of the mixing tube so as to form an effective ejector pump. A liquid manifold 38 is positioned around the exit end of the ejector nozzle 36. The manifold 38 may conveniently be closed by a rim member 40 to which the liquid line 28 is affixed. Several circumferentially spaced angularly directed threaded apertures 42 are formed in the front face 44 of the manifold 38 to receive atomizing nozzles 46. The atomizing nozzles 46 are circumferentially positioned about the ejector nozzle 36 and aimed so that the axes of the atomizing nozzles 46 will intersect at a point on the axis of the ejector nozzle 36 beyond the exit end of the ejector nozzle. The atomizing nozzles 46 are preferably of the fan-jet type designed to be self-cleaning and capable of handling liquids containing substantial amounts of suspended or dissolved material. Nozzles 46 should be capable of atomizing liquid to the size range of 100–200 microns just beyond the exit of each nozzle.

In FIG. 1 the jet 56 from the ejector nozzle 36 emerges at supersonic velocities and is therefore capable of further atomizing the liquid droplets formed by the atomizing nozzles 46 into a large number of droplets which are of the proper size to effectively capture very fine particulate. In addition, the high velocity relative to the contaminated gas stream, imparted to the droplets by the jet 56 together with the extreme turbulence existing at the interface of the emerging jet and the contaminated gas stream creates a highly efficient mixing zone within the reducing elbow 16 and the mixing tube 18 which insures capture of the particulate contained in the contaminated gas. If it is desired to remove acidic gases, such as sulfur dioxide, from the contaminated gas, basic chemical reagents, such as lime, ammonia (aqueous or anhydrous), or sodium hydroxide may be added to the injected water. On the other hand, if it is desired to remove basic substances such as ammonia from the contaminated gas stream, an acid reagent such as nitric acid may be added to the water introduced by the injection nozzles or other spray nozzles. Certain other substances, such as organic odors, which are neither acidic nor basic, may be removed by oxidants such as potassium permanganate added to the injected water. The reasons for the effectiveness of the ejector-injector device in capturing particulate apply equally to the reactions with gases so that both types of pollutant may be captured simultaneously. Moreover, as a result of formation of a supersonic jet 56 at the exit of the ejector nozzle 36, shock waves will be found downstream from the ejector nozzle. These shock waves, which represent abrupt discontinuities in the pressure and temperature of the jet, will enhance the mixing capability of the jet and thus further improve the cleaning ability of the system for both particulates and gaseous pollutants.

Applicants have discovered that while steam is a very desirable driving fluid for the ejector, air may also be used advantageously, despite the fact that greater quantities of air are required to perform the same pumping, atomizing and cleaning functions. It has been found, for example, that where 0.1 lb. of steam is required to drive a pound of contaminated gas, it will be necessary to provide about 0.17 to 0.20 lb. of air, depending upon the relative pressure of the steam and air, to accomplish the same result. However, as the cost of steam increases, a point is reached where the use of air becomes more economical in spite of the additional equipment required. This will be explained with reference to FIGS. 12 and 13. It is well known that the thermal efficiency of a steam ejector is in the range of 20 to 25%. Thus, although the steam may be used directly as described above in U.S. Pat. No. 3,852,409 to perform the driving function in a gas cleaning system, the cost of the steam is substantial. On the other hand, the thermal efficiency of a well designed steam turbine is in the vicinity of 80% and the mechanical efficiency of an air blower may exceed 90%. As shown in FIG. 12, steam may be formed in a boiler 48 and used to drive a steam turbine 50 which is, in turn, connected mechanically to a blower 52 capable of delivering air at a pressure in the range of 30 psi to an ejector nozzle 36. Of course, blowers operating at other pressures may also be used. Due to the higher efficiency of the turbine-blower system, the total cost of driving the contaminated gas by air may be substantially less, despite the need for acquiring and maintaining additional equipment. As an example, it has been determined that where 0.06 lb. of steam was required to drive each pound of gas using the steam directly in a well-designed ejector, the same cleaning and pumping results could be attained using only about 0.024 lb. of steam to drive the steam turbine-air blower combination shown in FIG. 12. In some industrial circumstances, electrical power may be more readily or economically available than steam as a prime mover. In this event, as shown in FIG. 13, it may be more efficient to drive an air blower 54 by an electric motor 55 and supply air under pressure to the ejector 36. In other circumstances, the process may be "pumping controlled", i.e. more energy is required for the pumping function than the cleaning function. Where this is true, it may be more economical to provide auxiliary fans or blowers than to supply the extra pumping energy by the ejector. The air entering either of blowers 52 or 54 may be ambient air or outlet gas recycled from the tailpipe 62 or stack 112.

Returning to FIG. 1, the jet 56 emerging from the ejector 36 contacts the mixing tube 18 at the circumferential region 58, known also as the "hook-up" region. As explained above, the contaminated gas must pass through the jet and be mixed therewith in order to pass beyond the axial location corresponding to the hook-up region. Thus, beyond the hook-up region 58, substantially all of the particulate matter will have been encapsulated in small water droplets which may also contain the reaction products resulting from the removal of noxious gases. However, the small droplets will not necessarily have uniform velocities and will therefore continue to collide with each other and the inner surface of the mixing tube to form a smaller number of larger drops. As set forth in said U.S. Pat. No. 3,852,409 assigned to applicants' assignee, the mixing tube was designed to be of sufficient length so that droplets of the size existing at the end thereof could be separated from the cleaned gas by means of a cyclone separator. Although the cyclone separator is an effective means of separating the water droplets, it is a relatively expensive component of the equipment and introduces a significant pressure drop into the system, usually in the range of 5 to 10 inches of water. The operating expense of any cleaning system is a function of the pressure losses which may be involved therein. Thus, while the system set forth in U.S. Pat. No. 3,852,409 represents a substantial advance over high energy wet scrubbers which involve pressure drops in the range of 40 inches of water or more, the inherent pressure losses in a cyclone constitute a limiting factor.

Applicants, according to the present invention, have discovered how to separate relatively small contaminant-containing droplets from a gas without incurring the pressure losses inherent in the prior art cyclone separators. Applicants utilize, first, a diffuser 60 (FIG. 1) which communicates with the exit of the mixing tube 18 to which it is secured, as by mating flanges 21 and 23. At its opposite end the diffuser 60 opens into a tailpipe section 62. The diffuser is preferably designed with an angle of divergence between the opposed inner surface portions thereof within the range of 7 to 15 degrees, preferably 10 degrees, and with an exit to entrance area ratio sufficient to reduce the mean velocity of the mixture from about 200 or more feet per second at the entrance of the diffuser to a velocity preferably in the range of 10 to 20 feet per second. The decrease in velocity results in an increase in pressure or a pressure recovery in accordance with the Bernoulli law. Simultaneously, the residence time of the gas and water droplets within the diffuser is increased so as to permit separation by gravitational forces and further increase of droplet size by collision. For a unit having a nominal capacity of 1000 lbs. of gas per minute and utilizing a mixing tube 18.000 inches in diameter, applicants prefer a conical diffuser having a half angle of 10°, an entry diameter of 18.000 inches, an exit diameter of 56.628 inches and a length (measured along the axis) of 109.549 inches.

Applicants have discovered, however, that merely using a diffuser in the conventional fashion is not as effective as the use of the elongated mixing tube and cyclone separator of said U.S. Pat. No. 3,852,409 because there is a tendency for some of the droplets to be carried along and become re-entrained by the gas before it leaves the diffuser. Accordingly, applicants have modified the operation of the diffuser to incorporate a partial flow separation of the gas-liquid mixture from one region of the inner surface of the diffuser with the result that a remarkably efficient separation of the liquid from the gas is achieved in the diffuser alone.

As shown in FIG. 1, partial flow separation is accomplished by inserting an obstruction adjacent the entrance of the diffuser 60 to create a turbulent low pressure region and induce the mixture to separate from a portion of the inner surface of the diffuser wall. At the same time, the obstruction serves to re-direct the liquid droplets toward the inner surface of the opposite wall portion of the diffuser. In FIG. 1 such obstruction is diagrammatically shown in the form of a fluid restriction 64 and a mechanical restrictor 66, both located adjacent the entry into diffuser 60. As will be more fully described below, either or both of these types of obstructions may be used and they may take any of several preferred forms. Also, the specific location may be varied as will be made clear. Either or both of these types of obstructions will be effective to deflect the mixture away from a portion 61 of the inner surface of diffuser 60 toward an opposite portion 63 thereof.

One form of a flow separating means which is effective for use in the present invention is shown in FIGS. 3A and 3B and comprises a fluid restriction 64 located adjacent the entrance to the diffuser 60 and, preferably, near the exit end of the mixing tube 18. The restriction 64 is formed by placing a fluid nozzle 68 in the wall of the mixing tube 18, in the uppermost portion of the mixing tube when a horizontally oriented mixing tube is used. Preferably, the fluid nozzle 68 should form the restriction 64 as a fluid curtain of relatively large drops of liquid, such as water or other aqueous liquid, across the mixing tube and adjacent the entrance to the diffuser. This may be accomplished, for example, through the use of a wide-angle fan-jet nozzle 68. While a single nozzle is adequate for use in systems having mixing tubes smaller than about 1 foot in diameter, two or more nozzles arranged symmetrically about the center of the mixing tube 18 as shown in FIGS. 5A and 5B may be desirable in systems employing larger mixing tubes. The interaction between the fluid curtain 64 and the mixture of gas and water droplets flowing down the mixing tube will tend to deflect the fluid curtain 64 into a generally parabolic shape and, simultaneously, deflect the droplets in the mixture toward the inner surface portion 63 of the lower wall of the diffuser. Moreover, additional droplet collisions will be induced so as to aid in the growth and agglomeration of droplets. As shown in FIGS. 4A and 4B, the nozzle 68 may be located in the entry portion of the diffuser 60 though the preferred location is as shown in FIG. 3A.

As shown in FIGS. 3B and 4B, the fluid curtain 64 from the nozzle 68 does not fill the cross section of the mixing tube 18 completely. Although this form of the separating means is effective to induce partial separated flow in the diffuser 60, it is not fully effective for the additional function of redirecting the flow of the droplets contained in the mixture flowing through the mixing tube. In the alternative form of the separating device shown in FIGS. 6A and 6B, the nozzle 68 is displaced radially from the center of the mixing tube 18 in an extension sheath 70 which communicates with the outer periphery of the mixing tube 18. With this arrangement, the fan-shaped jet emerging from the nozzle 68 will form a fluid curtain 64 which is substantially uniform across the mixing tube 18.

Applicants have conducted a series of tests to determine the effect of the addition of an atomized water spray as a fluid curtain 64 of the type just discussed, to effect separated flow and droplet coalescence and have found significant advantages from the addition of such water. In these tests, no mechanical restrictor was used. For example, in an operation conducted without the use of a water separating means, the measured outlet dust loading was about 0.04 grains per standard cubic foot. With the addition of 0.4 lb. water per lb. of gas, the outlet dust loading dropped to about 0.02 grains per scf. In general, minimum outlet dust loadings occurred when amounts of water in the range of 0.4 to 0.8 lb. water per lb. gas were used. Other tests have shown the importance of locating the fluid curtain 64 near the junction of the mixing tube 18 and the diffuser 60. Where about 0.5 lb. of water per lb. of gas was introduced near the exit end of the diffuser 60, an outlet dust loading of 0.138 grains per standard cubic foot of outlet gas was measured. When substantially the same quantity of water was introduced near the exit of the mixing tube 18, the measured outlet dust loading dropped to about 0.035 grains per standard cubic foot of outlet gas.

The addition of the fluid curtain 64, however, affects the pumping capacity of the apparatus in that the pumping capacity decreases for a constant energy input as the restriction, due to the fluid curtain, becomes greater. Similarly, pumping capacity decreases as the draft increases for each level of fluid curtain restriction. Both of these facts are illustrated by the data set forth in Table 1 below:

TABLE 1

EFFECT OF FLUID CURTAIN RESTRICTION ON PUMPING CAPACITY

| Run | Ejector Steam Rate (lb./min.) | Gas Pumped (lb./min.) | α, Steam (lbs.steam/lb.gas) | Draft (in. water) | Water Restriction (lb./min.) |
|---|---|---|---|---|---|
| 105-1 | 6.982 | 103.9 | .067 | 0 | 0 |
| -2 | 6.982 | 95.7 | .073 | −2 | 0 |
| -3 | 6.982 | 87.2 | .080 | −4 | 0 |
| -4 | 6.982 | 78.9 | .089 | −6 | 0 |
| -5 | 6.982 | 69.4 | .101 | −8 | 0 |
| -6 | 6.982 | 58.2 | .120 | −10 | 0 |

TABLE 1-continued
EFFECT OF FLUID CURTAIN RESTRICTION ON PUMPING CAPACITY

| Run | Ejector Steam Rate (lb./min.) | Gas Pumped (lb./min.) | α, Steam (lbs.steam/lb.gas) | Draft (in. water) | Water Restriction (lb./min.) |
|---|---|---|---|---|---|
| 106-1 | 6.982 | 102.7 | .068 | 0 | 14 |
| -2 | 6.982 | 92.0 | .076 | −2 | 14 |
| -3 | 6.982 | 83.7 | .083 | −4 | 14 |
| -4 | 6.982 | 73.3 | .095 | −6 | 14 |
| -5 | 6.982 | 65.7 | .106 | −8 | 14 |
| -6 | 6.982 | 56.3 | .124 | −10 | 14 |
| 107-1 | 6.982 | 93.9 | .074 | 0 | 38 |
| -2 | 6.982 | 85.5 | .082 | −2 | 38 |
| -3 | 6.982 | 77.7 | .090 | −4 | 38 |
| -4 | 6.982 | 65.7 | .106 | −6 | 38 |
| -5 | 6.982 | 56.6 | .124 | −8 | 38 |
| -6 | 6.982 | 47.8 | .146 | −10 | 38 |

Figure 7A:
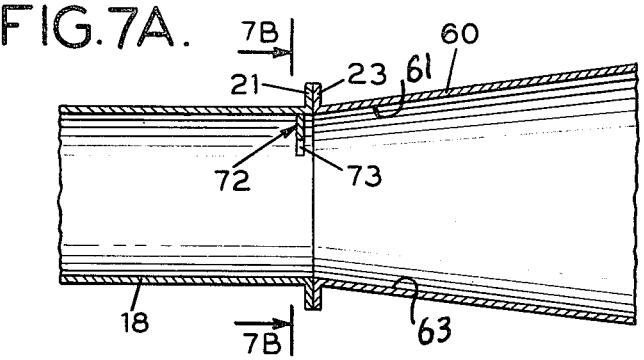
Figure 8B:
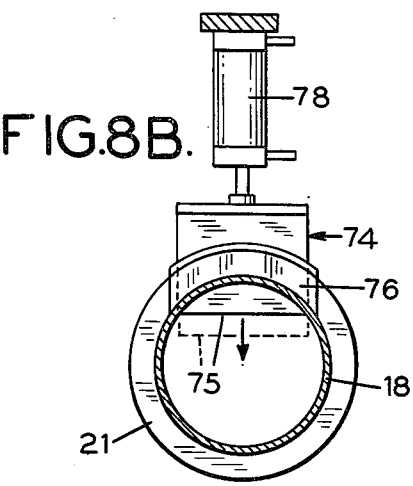
FIGS. 8A and 8B are, respectively, side and end views, with parts in section, of an alternate form of a mechanical separating means which is adjustable.
Figure 8A:
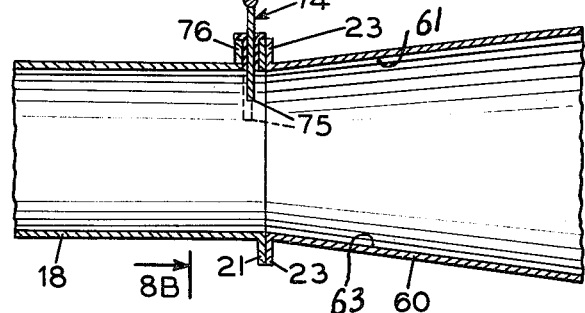
Figure 9B:
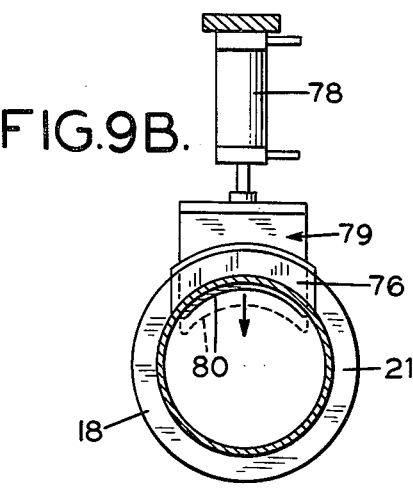
FIGS. 9A and 9B are, respectively, side and end views, with parts in section, of a second alternative form of an adjustable mechanical separating means.
Figure 9A:
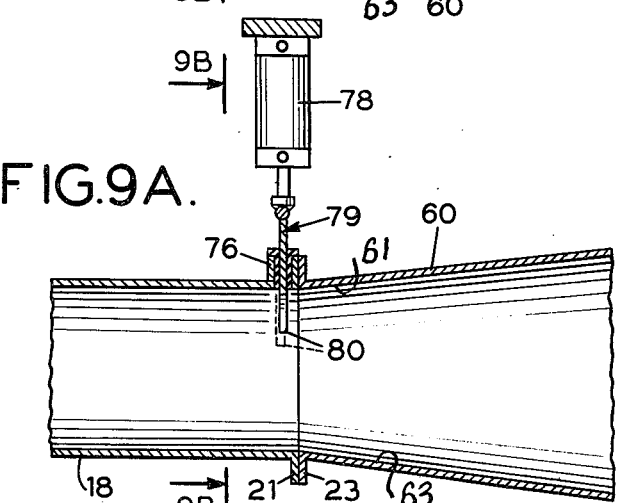

Applicants have also evaluated the use of a mechanical restrictor alone to induce flow separation in the diffuser. One such means which provides a fixed restriction is shown in FIGS. 7A and 7B. This device comprises an orifice plate 72 having a concave inner edge 73 curved eccentrically or elliptically relative to the curvature of the mixing tube 18. The plate 72 may be mounted conveniently at the end of the mixing tube 18 or between the flanges 21 and 23 joining the mixing tube 18 and the diffuser 60. The orifice plate 72 is mounted to provide an obstruction only in the upper region of the horizontally disposed mixing tube 18. Another form of the separator is shown in FIGS. 8A and 8B. In this instance, the separating means comprises a flat plate 74 having a straight inner edge 75. The plate 74 is positioned for reciprocating movement in a stuffing box 76 mounted on the outside surface of the mixing tube 18. The radial position of the edge 75 of plate 74 may be controlled by a hydraulic or pneumatic cylinder 78 or the like. As is apparent from FIG. 8B, the plate 74 subtends a segment of the circular cross-section of the mixing tube 18, and creates a back pressure in the mixing tube. At the same time a low pressure region is induced on the downstream side of the plate 74 together with a turbulent zone characterized by eddy currents intermediate the low pressure zone and the remainder of the diffuser. In order to induce flow separation without creating a back pressure greater than necessary, it may be found beneficial to form a plate 79, otherwise identical with plate 74 in FIGS. 8A and 8B, with an arcuate lower edge 80 as shown in FIGS. 9A and 9B. In operation, the plate 74 of FIGS. 8A and 8B or the plate 79 of FIGS. 9A and 9B may be controlled by the cylinder 78 to enter the mixing tube 18 to a sufficient extent to create the necessary pressure rise or "back pressure" required to cause the ejector to "hook up" with the mixing tube 18. Thereafter, the plate 74 or 79 may be withdrawn to a position which produces minimum back pressure consistent with adequate flow separation.

Figure 10B:
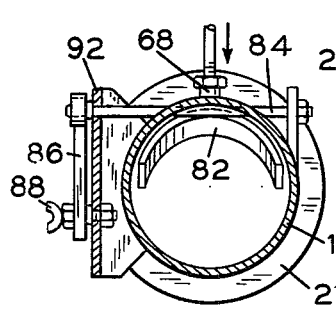
FIGS. 10A and 10B are, respectively, side and end views, with parts in section, of a flow separating device employing both fluid and mechanically adjustable flow separating means.
Figure 10A:
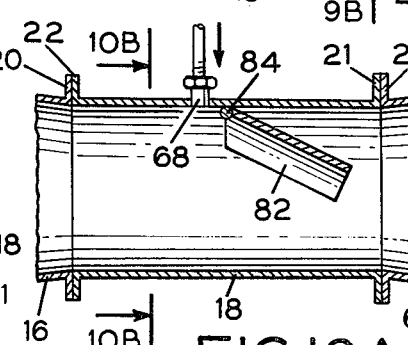
Figure 10C:
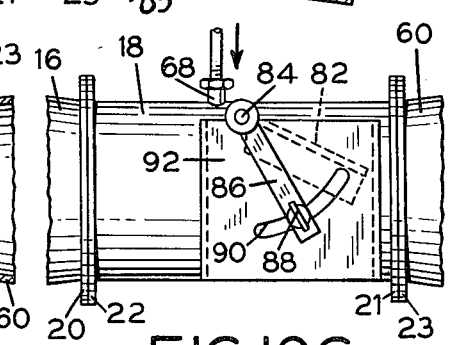
FIG. 10C is a side elevational view of the separating device shown in FIGS. 10A and 10B.

The forms of mechanical separators shown in FIGS. 7A, 8A and 9A all present a flow restriction or obstruction which is essentially normal to the path of flow of the gas and water mixture through the mixing tube 18. It is desired, however, to induce a separation of the droplets from the mixture at an early point and, for this reason, it is helpful to provide means for redirecting the flow of the water droplets with minimum energy consumption. This may be accomplished as shown in FIGS. 10A, 10B and 10C by the use of a separator plate 82 mounted on a shaft 84 journalled for oscillatory motion in the mixing tube 18. The position of the separator plate 82 may be controlled by an arm 86 which may be locked at any desired position by a lock bolt 88 constrained to move in an arcuate slot 90 formed in the locking plate 92. Typical test data for the mechanical separator plate alone indicates that an increase in the plate angle from 20 to 30 degrees decreased the outlet dust loading from 0.069 to 0.042 grains per standard cubic foot of outlet gas. Although, as shown in FIGS. 10A, 10B and 10C, the separator plate is adjusted manually, it will be appreciated that the separator plate 82 may be moved by a fluid cylinder similar to cylinder 78 shown in FIGS. 8A and 9A. In addition, such a fluid cylinder may be actuated automatically in response to a signal generated by any of the parameters of the system such as the flow rate of the gas or the pressure or draft at any point in the system.

In certain instances, it may be preferred to use both the fluid separating means and the mechanical separating means in combination since each means contributes to the separation of the droplets containing pollutants in a slightly different but complementary manner. Thus, any of the fluid separators of FIGS. 3A to 6A may be combined with any of the mechanical separators of FIGS. 7A through 10A. By using both devices in combination, a flexible control system is possible and adjustment may be made to provide the minimum consumption of energy and raw materials consistent with the cleaning task to be accomplished. Such a combination is shown in FIGS. 10A, 10B and 10C where a nozzle 68 of any of the types disclosed herein has been shown in an illustrative position. Also, as shown in these figures, both the fluid and mechanical separators and the mixing tube may be fabricated as a unit separate from the reducing elbow 16 and diffuser 60 to simplify construction of the equipment.

The effect of varying the angle of a mechanical separator means while maintaining a fluid curtain forming a fluid separating means was also tested by applicants. Illustrative data from such tests is contained in Tables 2 and 3 below. The data in Table 2 demonstrates that, within limits, improved cleaning can be obtained by increasing the magnitude of the restriction. However, as shown by the data in Tables 1 and 3, the pumping capacity decreases as the fluid and mechanical restrictions increase for constant energy input. Of course, within the limits of the system, as is also shown in Table 3, an increase in the energy input will be reflected in increased pumping or greater draft.

TABLE 2
EFFECT OF VARIATION IN MECHANICAL RESTRICTION ON OUTLET EMISSION

| Run | Fluid Separator Input (lbs.water/lb.gas) | Mechanical Separator Angle (Degrees from horizontal) | α, Steam (lbs.steam/lb.gas) | Outlet Emission (gr./scf) |
|---|---|---|---|---|
| 100 | .244 | 0 | .145 | .037 |
| 99 | .246 | 15° | .145 | .038 |
| 98 | .239 | 30° | .139 | .031 |
| 96 | .247 | 45° | .144 | .022 |
| 97 | .245 | 60° | .143 | .022 |

TABLE 3
EFFECT OF VARIATION IN FLUID RESTRICTION AND INPUT ENERGY ON PUMPING CAPACITY

| Run | Ejector Steam Rate (lb./min.) | Gas Pumped (lb./min.) | α, Steam (lb.steam/lb.gas) | Draft (in. H$_2$O) | Mechanical Separator Position (Degrees) | Water Restriction (lb./min.) |
|---|---|---|---|---|---|---|
| 109-1 | 6.982 | 86.5 | .081 | 0 | 30 | 14 |
| -2 | 6.982 | 79.4 | .088 | -2 | 30 | 14 |
| -3 | 6.982 | 71.4 | .098 | -4 | 30 | 14 |
| -4 | 6.982 | 62.2 | .112 | -6 | 30 | 14 |
| -5 | 6.982 | 57.1 | .122 | -8 | 30 | 14 |
| -6 | 6.982 | 48.5 | .144 | -10 | 30 | 14 |
| 108-1 | 6.982 | 81.4 | .086 | 0 | 30 | 38 |
| -2 | 6.982 | 74.1 | .094 | -2 | 30 | 38 |
| -3 | 6.982 | 65.7 | .106 | -4 | 30 | 38 |
| -4 | 6.982 | 61.8 | .113 | -6 | 30 | 38 |
| -5 | 6.982 | 54.2 | .129 | -8 | 30 | 38 |
| -6 | 6.982 | 48.3 | .144 | -10 | 30 | 38 |
| 110-6 | 9.434 | 113.4 | .083 | 0 | 30 | 14 |
| -5 | 9.434 | 107.1 | .088 | -2 | 30 | 14 |
| -4 | 9.434 | 96.2 | .098 | -4 | 30 | 14 |
| -3 | 9.434 | 90.8 | .098 | -6 | 30 | 14 |
| -2 | 9.434 | 76.8 | .123 | -8 | 30 | 14 |
| -1 | 9.434 | 70.4 | .134 | -10 | 30 | 14 |

While applicants' work has demonstrated that, within a range, both the fluid and mechanical restrictions are effective to maximize the efficiency of the cleaning operation, e.g. to obtain the desired cleaning results with a minimum expenditure of energy, the precise balance of the two restrictions depends upon the cost and availability of water at the location of the equipment as well as the nature of the process effluent being controlled.

As noted above, applicants' apparatus utilizes a compressible fluid ejector 36 which may comprise a steam ejector or an air or other compressible fluid ejector. The choice between the use of steam or air is usually determined by the total economics of the installation. In general, where the cost of steam exceeds about $0.75 per 1000 pounds of steam per minute, the use of air will be indicated. The pressure at which the air is supplied to the ejector 36 is also a matter of choice governed by economics. In general, a blower designed to deliver a given amount of air, by weight, at about 30 p.s.i.g. is much less expensive to acquire and maintain than one that operates at significantly higher pressures. The need for larger ducts to handle lower pressure air may, from the standpoint of cost and space requirements, dilute this apparent advantage. Of course, where air is used, the ejected air is added to the gas being treated and since air is not condensible the equipment must be sized accordingly. As shown in Table 4, about 1.7 to 2.0 times as much air as a driving fluid (D.F.), on a weight basis, is required to obtain the same result as can be attained with the use of steam.

TABLE 4

| Run | Driving Fluid | α, D.F. (lbs. D.F./lb. gas) | Draft (in. H$_2$O) | Outlet Emission (gr./scf) |
|---|---|---|---|---|
| 184 | Steam | .110 | -6.0 | .030 |

TABLE 4-continued

| Run | Driving Fluid | α, D.F. (lbs. D.F./lb. gas) | Draft (in. H$_2$O) | Outlet Emission (gr./scf) |
|---|---|---|---|---|
| 183 | Air | .250 | -7.8 | .027 |
| 167 | Steam | .106 | -4.0 | .034 |
| 169 | Air | .206 | -3.3 | .037 |

To accommodate large variations in the flow of the contaminated gas stream and to insure continuous operation of the system, even during periods of maintenance or repair, it may be desirable to provide a modular system so that the contaminated gas stream may be split into a number of parts for treatment. In this case, the module size and number of modules are selected to minimize the capital cost of the total system while meeting the need for continuous operation. Where several modules are supplied and fewer than the total number are required to be used at any one time, it is desirable to be able to valve off the flow of contaminated gas through the non-operating modules. This may be accomplished according to the present invention by appropriate modification of the mechanical separating means as shown, for example, in FIGS. 11A and 11B. In FIGS. 11A and 11B, a mixing tube 218 otherwise similar to the mixing tube 18 may be modified by the incorporation of a transition section 94 located preferably beyond the hook-up region 58 by which the cross-section is changed from a circular shape in the hook-up region 58 to a rectangular shape 100. The separating plate 96 may then also be rectangular and pivoted for oscillatory movement about a shaft 98 journalled in the walls of the rectangular portion of the mixing tube following the transition section 94. The separating plate 96 is made sufficiently great in length from the shaft 98 to the lower edge 99 that, when swung to a vertical position the lower edge 99 will seal against the bottom wall of the rectangular portion 100. The plate 96 thus fuctions as a damper to prevent flow of gas through the system. To provide complete flexibility of operation together with simple construction, a fluid separating means may also be utilized and the transition section 94 and fluid and mechanical separating means combined in a unit similar to that shown in FIGS. 10A–10C.

Where the mixing tube 18 terminates in a rectangular cross-section as shown in FIGS. 11A and 11B, it is desirable to use a diffuser 260 which has a rectangular cross-section for ease of fabrication and simplicity of design. The latter advantages of the rectangular diffuser increase as the size of the diffuser increases. In the rectangular diffuser 260 of FIGS. 11A and 11B the separator plate 96 serves to deflect the flow of the mixture away from the inner surface portion 261 of the diffuser toward the opposite inner surface portion 263 thereof.

Returning to FIG. 1, the diffuser 60 communicates with a tailpipe section 62, generally larger in cross-section than the exit end of the diffuser 60. In general, the tailpipe 62 will be of the same shape as the exit end of the diffuser 60, i.e. it may be round, elliptical or rectangular, and will terminate in a flat end plate 102. To simplify cleaning and inspection, a door 104 may be positioned in the end plate 102. Within the lower portion of the tailpipe section 62, there may be placed an angularly disposed baffle plate 106 separated both from the bottom wall 108 and the end plate 102 of the tailpipe section. The baffle plate 106 is designed to form, with the tailpipe walls, a duct for the passage of the slurry comprising the contaminated water separated from the gas and water mixture which entered the diffuser. The slurry exits the system through a drain 110. The baffle plate 106 serves also to inhibit re-entrainment of the separated water by the cleaned gas. Of course, any additional water which may separate from the gas stream within the tailpipe 62 flows rearwardly along the baffle 106 to the rear wall 102 of the tailpipe and thence to the drain 110.

The clean gas leaves the tailpipe 62 through a stack 112 which communicates with the upper portion of the tailpipe 62. Preferably, the stack 112 is provided with a downwardly directed baffle 114 on its upstream side to prevent carryover of any droplets which may not yet have been deflected to the bottom regions of the diffuser 60 and tailpipe 62. The stack 112 may be of any desired height since the stack is not required for purposes of draft or dispersion of off-gases. However, if a stack is available it may advantageously provide draft on the system and thereby reduce the pumping load on the ejector. As a matter of course, it is generally desirable to provide at least a short stack to keep foreign materials from accidentally being introduced into the tailpipe or diffuser.

FIG. 14 illustrates on a somewhat enlarged scale and in schematic fashion the nature of the flow which it is believed occurs within the diffuser 60 in accordance with the present invention. For illustrative purposes, both the fluid separating means 64 (and its associated nozzle 68) and a mechanical separating means 66 are shown though it will be appreciated that either device along could be used.

The gas and pollutant-containing water droplet mixture 116 passing through the mixing tube 18 first encounters the fluid separating means 64, preferably comprising a curtain of water droplets formed by an atomizing nozzle or nozzles 68 located in the wall of the mixing tube. It is believed that the reaction of the gas and water droplet mixture 116 on the fluid curtain 64 tends to deflect the fluid curtain laterally (as shown in FIG. 14) and simultaneously begins to deflect the water droplets from the mixture 116 downwardly. A similar effect is produced by the mechanical separation means 66. As a result, the droplets 118 tend to become larger but fewer in number due to collision among themselves and with the wall of the diffuser 60. A stream of pollutant-containing water 120 forms along the inner surface portion 63 of the lower wall of the diffuser 60.

Downstream of the fluid or mechanical separating means 64 or 66, a low pressure region 122 is formed as the mixture 116 is forced by the separating means to separate from the inner surface portion 61 of the upper portion (as shown in FIG. 14) of the diffuser 60. It is believed that a region of lower pressure exists generally in the upper portion of the diffuser 60 which is characterized by a reverse flow of gas from the exit end of the diffuser toward the low pressure region 122 at the upper portion of the entry end. As the principal flow of gas is toward the exit of the diffuser, it is believed that a series of whorls or eddies 124 are formed within the upper region of the diffuser which migrate toward the entry end of the diffuser. It is believed that small droplets which have not yet separated from the mixture 116 or been redirected by the separating means are thus returned toward the entry end of the diffuser. The extended residence time of such droplets within the diffuser provides an opportunity for further growth by impaction, condensation or coalescense until the droplets become large enough to separate from the gas. In order for the diffuser to function effectively to separate the pollutant-laden droplets from the gas, the diffuser should have a half angle generally between 7 and 15 degrees and be of such design that, without the addition of special separating means 64 or 66, it would operate without flow separation. Applicants have found a 10° diffuser to be satisfactory for this purpose. The length of the diffuser should be sufficient to decelerate the gas stream to a point where droplet carryover is minimized. Applicants have found that a mean gas velocity in the range of 10–20 feet per second at the exit end of the diffuser is adequate for this purpose.

Using the open diffuser 60 as shown in FIG. 14, applicants are able to obtain substantial pressure recovery within the diffuser so that the outlet pressure ranges between 0 and −1.0 inches of water. By providing a baffle 114 (see FIG. 1) in the tailpipe 62 adjacent the exit or stack 112, the outlet pressure will be increased slightly, e.g. to the range of 0.5 to 0 inches of water but the allowable exit velocity of the gas may be increased without the occurrence of any substantial increase in droplet carryover. Thus, the addition of the baffle 114 permits a particular system to be operated over a greater range of gas flow rates or to provide improved cleaning at the designed flow rate.

As noted above, it is desirable to provide a modular system so as to be able to handle varying flow rates of contaminated gas as well as to permit maintenance without interruption of the process. FIG. 15 illustrates an arrangement of six modules of the type illustrated in FIG. 1 connected to an existing stack 130. In this case, the existing stack 130 is of sufficient size to obviate the need for a tailpipe. The slurry which drains from the several diffusers 60 is removed from the base of the stack 130 through a drain 132.

Where a relatively large number of modules is required for a given installation, it may be impractical to arrange the modules radially about an existing stack. In such a situation, an arrangement like that shown in FIG. 16 may be more feasible. Modules of the type shown in FIG. 1 are arranged in two parallel columns feeding into opposite sides of a manifold 134 which, in turn, communicates with the stack 130. In this arrangement, the manifold 134 performs the function of the tailpipe 62. It will be noted that the parallel arrangement provides a convenient means to use manifold type supply systems 210, 230, 228 and 268 for the supply of contaminated gas, air or steam, and water respectively to the system. The manifold system 228 supplies water to the ejector-injector nozzles A (FIG. 1) while the manifold system 268 supplies water to the fluid restrictor nozzles 68 (FIG. 1). As will be apparent, almost any number of modular units can be assembled into a system as shown in FIG. 16.

Although the apparatus according to the present invention has been described principally in relation to a horizontally disposed apparatus, the mixing tube and diffuser may also be arranged vertically as shown in FIG. 17. In this orientation, the gas and water droplet mixture moves vertically downwardly through a mixing tube 18' and past horizontally disposed fluid separator means 64' supplied by water nozzle 68'. The water droplets in the mixture are urged away from the right-hand wall portion 138 of a diffuser 60' by the fluid separator means 64'. Further deflection of the droplets is caused by the mechanical separator 66'. A low pressure region 222, like the region 122 in FIG. 14, appears adjacent the sloping wall 138 just below the mechanical separator 66'. The downwardly flowing gas is compelled to make two 90° bends past baffles 140 and 142 in an enclosure 143 before reaching the stack 144. Due to the enlarged cross-sectional area of the diffuser 60', the mixture is decelerated to a velocity in the range of 10–20 feet per second. At these velocities, it is difficult for the water droplets to remain entrained with the gas flow or become reentrained. For this reason, the water droplets will fall to the bottom 146 of enclosure 143' and, with the remainder of the slurry, will leave the system through the drain 148.

FIG. 18 illustrates diagrammatically an arrangement of four vertically oriented scrubbing modules which may be identical with the one shown in FIG. 17, manifolded to a stack 145 rising from a manifold 147 which may be square or rectangular in cross-section. In FIG. 18, the ground level is indicated by the figure "a" so that the modules are essentially underground. Since the principal source of noise in each of the modules is derived from the supersonic jet within the elbow 16' and the mixing tube 18', the fact that the mixing tube 18' is below ground level will result in substantial damping of the noise. Of course, the system need not be installed below ground level and the dotted lines "b", "c" and "d" suggest different ground levels that may be preferred.

Figure 16:
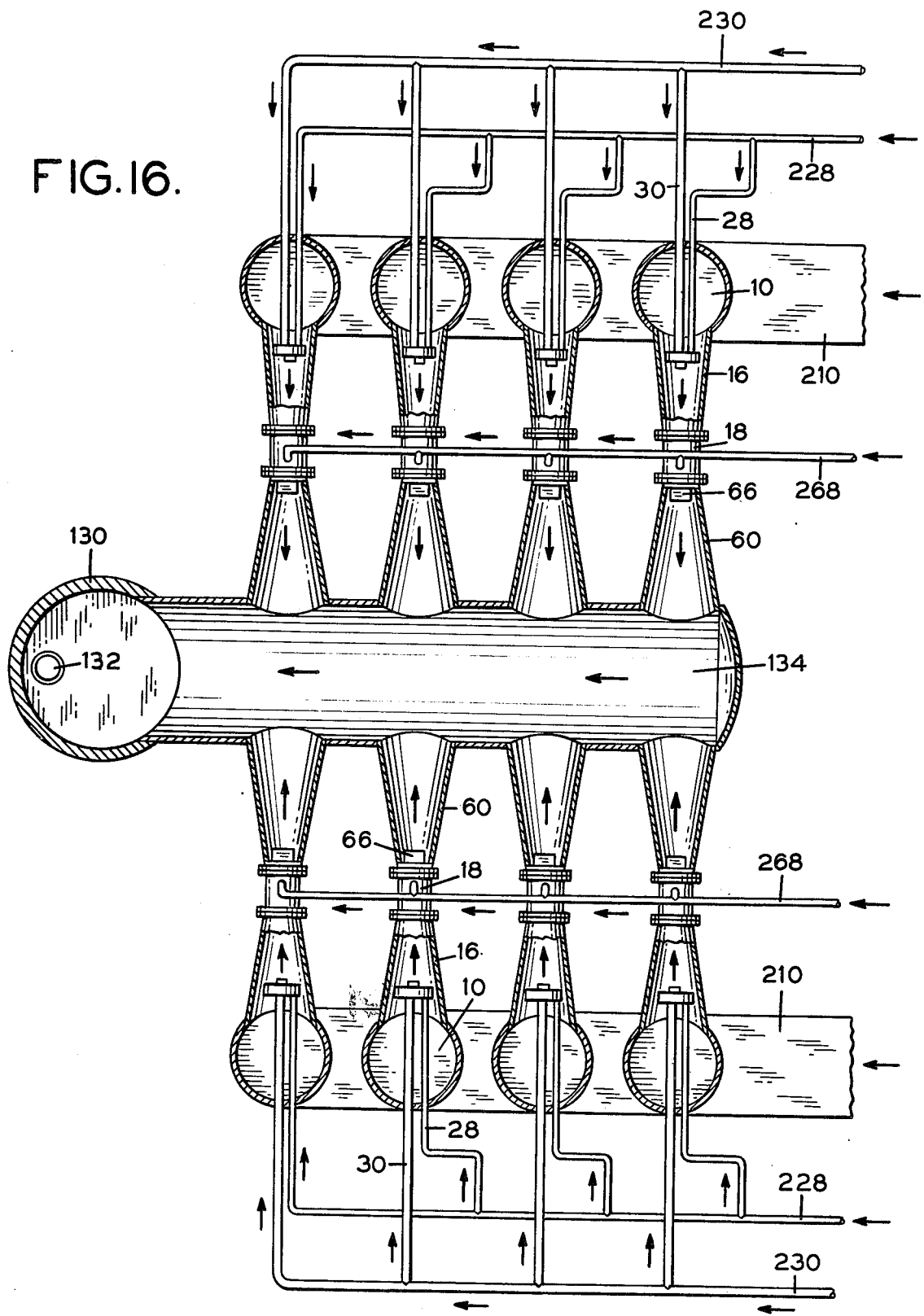
FIG. 16 is a plan view, with parts in section, illustrating schematically another embodiment of a system of gas cleaning modules of the present invention manifolded to a single stack.

In the several manifolded systems shown in FIGS. 15, 16 and 18 the mixing tubes 18 or 18' and the diffusers 60 or 60' have been shown as circular in cross-section thus to more readily relate the structures with FIG. 1. However, as noted above in describing FIGS. 11A and 11B it frequently is highly desirable to be able to shut off one or more of the manifolded modules for any of several reasons. While this may be arranged in any convenient manner the modification shown in said FIGS. 11A and 11B offers the advantage of combining the mechanical separator function with that of a damper. Thus, the modification shown in FIGS. 11A and 11B may be adapted to any of FIGS. 15, 16 or 18 in which event the mixing tubes will have transition zones from circular to square cross-section, like mixing tube 218 in FIGS. 11A and 11B and the diffusers may be square in cross-section as there shown. Furthermore the manifold 134 of FIG. 16 may be square or rectangular in cross-section if so preferred, whereas the square or rectangular manifold 147 of FIG. 18 may be circular in cross-section if so preferred.

U.S. Pat. Nos. 3,852,408 and 3,852,409 teach how pollutant gases such as sulfur dioxide may be removed by adding an appropriate basic chemical reagent to the water introduced through the injector nozzles 46 into the jet 56 emerging from the ejector nozzle 36 (FIG. 1). In some circumstances, the preferred chemical reagent for the removal of sulfur dioxide is ammonia, either as a gas or as a concentrated hydroxide solution. Where gaseous ammonia is used, it may be injected into the contaminated gas duct 10 in advance of the ejector-injector device. On the other hand, the liquid ammonium hydroxide solution may be introduced into the water line 28 in advance of the injector manifold 38.

The invention as described above has been directed principally to the treatment of effluent streams of contaminated gas which may be emitted from various processes. However, as noted above, ecological conditions may occur where the ambient air contains a level of particulate or gaseous pollutant which is incompatible with certain processes or processing equipment. For example, where it is desired to introduce ambient air into blowers or compressors, even relatively small amounts of particulate or sulfur dioxide may result in serious erosion or corrosion problems. Within the compressor, the air being compressed may reach the dew point and permit the formation of sulfuric acid. If this condition occurs, it may become necessary to use expensive corrosion resistant materials for the compressor and the following portions of the process equipment. Although various types of filters may be used to capture most of the particulate, the pressure drops across such filters may amount to several inches of water and thus represent a substantial energy requirement. Moreover, heretofore there has been no practical means of removing pollutants, such as small amounts of sulfur dioxide, from the ambient air.

The present invention is admirably suited to the preconditioning of ambient air for use in a compressor or other process. FIG. 19 illustrates such an application. The apparatus of FIG. 19 comprises an inlet duct 10, a reducing elbow 16, mixing tube 18, diffuser 60 and tailpipe 62 (all similar to corresponding elements in FIG. 1) communicating with an inlet duct 150 of a conventional blower or compressor 152 having an outlet 154. High pressure air may be bled from the compressor outlet 154 through air line 156 to an appropriate pressure regulator valve 158 which communicates with the air line 30 and the air ejector nozzle 36. If the ambient air contains an acidic gaseous pollutant such as sulfur dioxide, a liquid recirculation tank 160 may be provided with an aqueous solution 162 containing sodium hydroxide, ammonia or another appropriate alkaline reagent. Liquid is drawn from tank 160 through liquid line 164, valve 166, and filter 168 by means of a pump 170. If desired, a regulated by-pass 172 and a liquid flow regulator 174 may be provided to control the operation of the pump 170. The aqueous alkaline reagent 162 is then directed to the injector nozzles 46 (see FIG. 1) through water line 28. If it is desired to utilize a fluid separating means 64, the atomizing nozzle or nozzles 68 may be connected to the outlet of the pump 170 before the liquid flow regulator 174 by means of a liquid line 176 and appropriate regulator valve 178. An appropriate mechanical separating means 66 may also be used. The slurry from the tailpipe 62 is returned to the liquid recirculation tank 160 through drain 110 and drain line 180. Make-up liquid and chemical reagent may be added to the liquid recirculation tank 160 through make-up line 182.

Inasmuch as the ambient air normally contains relatively low levels of particulate and gaseous pollutants, a recirculating system as described is capable of operating for substantial periods of time before it becomes necessary to clean the sludge from the tank 160 or to replace the chemical reagent. Although, as shown in FIG. 19, an air ejector connected to the compressor outlet is utilized, it will be appreciated that air from any commercial source or steam or other compressible fluid could be used as the driving fluid.

During the development of the present invention, applicants have considered the effect of the principal variables which control the removal of particulate matter and the pumping of contaminated gas through a cleaning system. With respect to the cleaning function, the principal variables appear to be dust composition, (i.e. wettability and density), particle size, grain loading of the contaminated gas, moisture content and temperature of the outlet gas, and driving fluid pressure. Applicants' analysis indicates that the weighted effect of these cleaning variables is as shown in Table 5 below:

TABLE 5

| WEIGHTED EFFECT OF RELEVANT CLEANING VARIABLES | |
|---|---|
| Parameter | % Weighted Effect |
| 1 - Dust Composition | |
| (a) Wettability | 38 |
| (b) Density | 12 |
| 2 - Particle Size | 29 |
| 3 - Grain Loading | 8 |
| 4 - Moisture and Temperature | 8 |
| 5 - Driving Fluid Pressure | 5 |

The principal variables which affect the pumping capability of applicants' apparatus appear to be the draft required, the moisture content and temperature of the contaminated gas stream, and the pressure of the driving fluid. It will be appreciated that certain of these variables affect both the cleaning and pumping functions, while others affect only one function. The weighted effect of the pumping variables is shown in Table 6 below:

TABLE 6

| WEIGHTED EFFECT OF RELEVANT PUMPING VARIABLES | |
|---|---|
| Parameter | % Weighted Effect |
| 1 - Draft | 50 |
| 2 - Moisture Content and Temperature | 40 |
| 3 - Driving Fluid Pressure | 10 |

Applicants' analysis of the above variables was performed with the aid of a mathematical model and confirmed by a number of tests on actual processes involving different operating conditions. Based upon the analysis and test results, applicants have derived a group of curves which relate the input energy expressed in pounds of steam of air required per pound of gas to be treated to the emission in grains of particulate per standard cubic foot of cleaned gas at the outlet of the system. These typical curves are shown in FIGS. 20 through 25.

Figure 20:
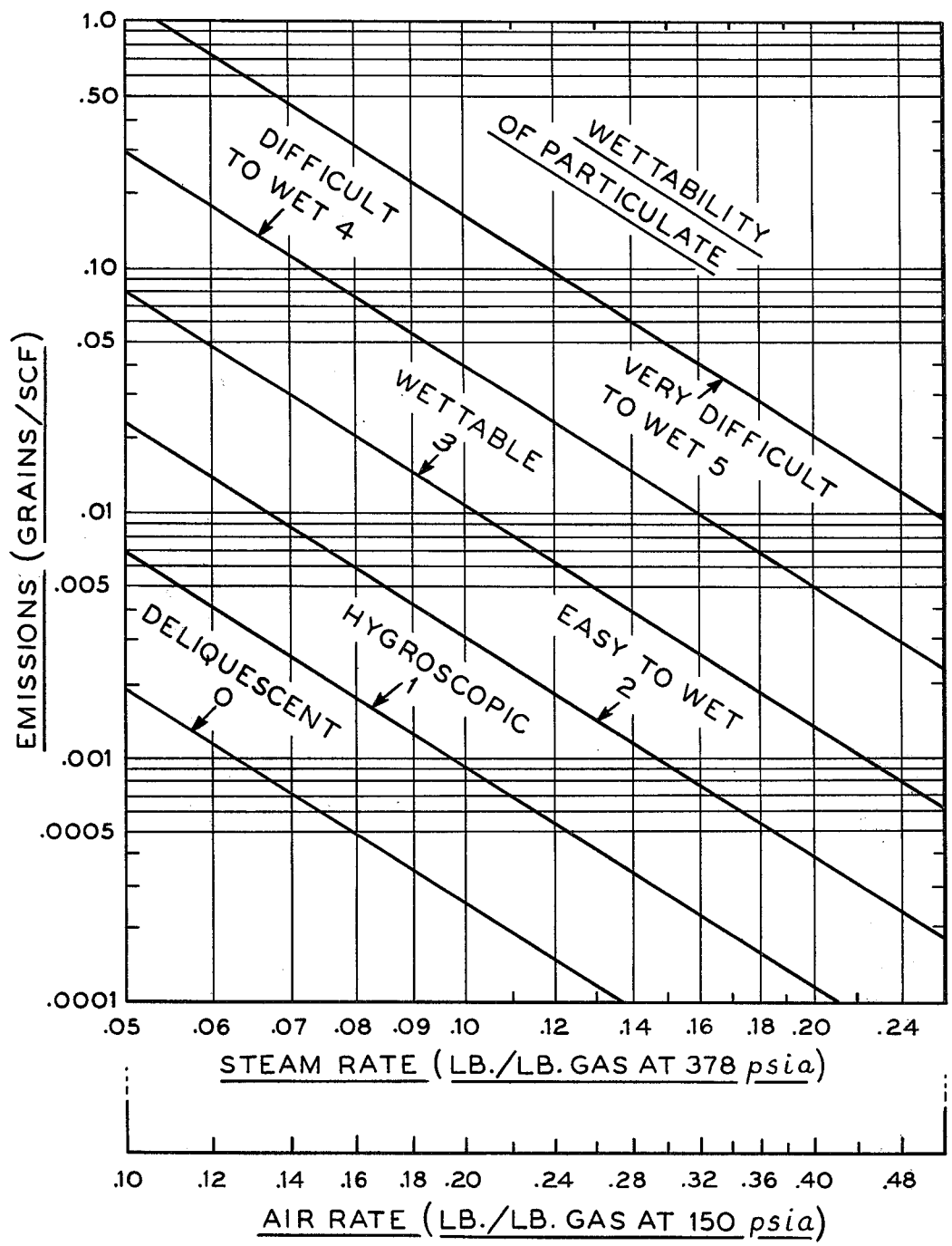
FIG. 20 is a family of curves showing the effect of particulate wettability on the relationship between the outlet emission level of the gas being treated and the required input energy.

FIG. 20 shows the effect of particulate wettability on an arbitrary scale of 0 to 5 on the outlet emission level of the gas being treated. This figure illustrates that wettability is a major factor in the performance of the cleaning system and demonstrates the importance of precise information concerning the nature of the particulate which is to be removed from the contaminated gas. FIG. 20 also explains why a system may perform differently on various processes. However, as applicants' apparatus includes a highly efficient contacting and mixing component (see FIGS. 1 and 2), applicants are enabled to handle even extremely hard to wet substances, such as carbon black and silica by an appropriate increase in the input energy.

Figure 21:
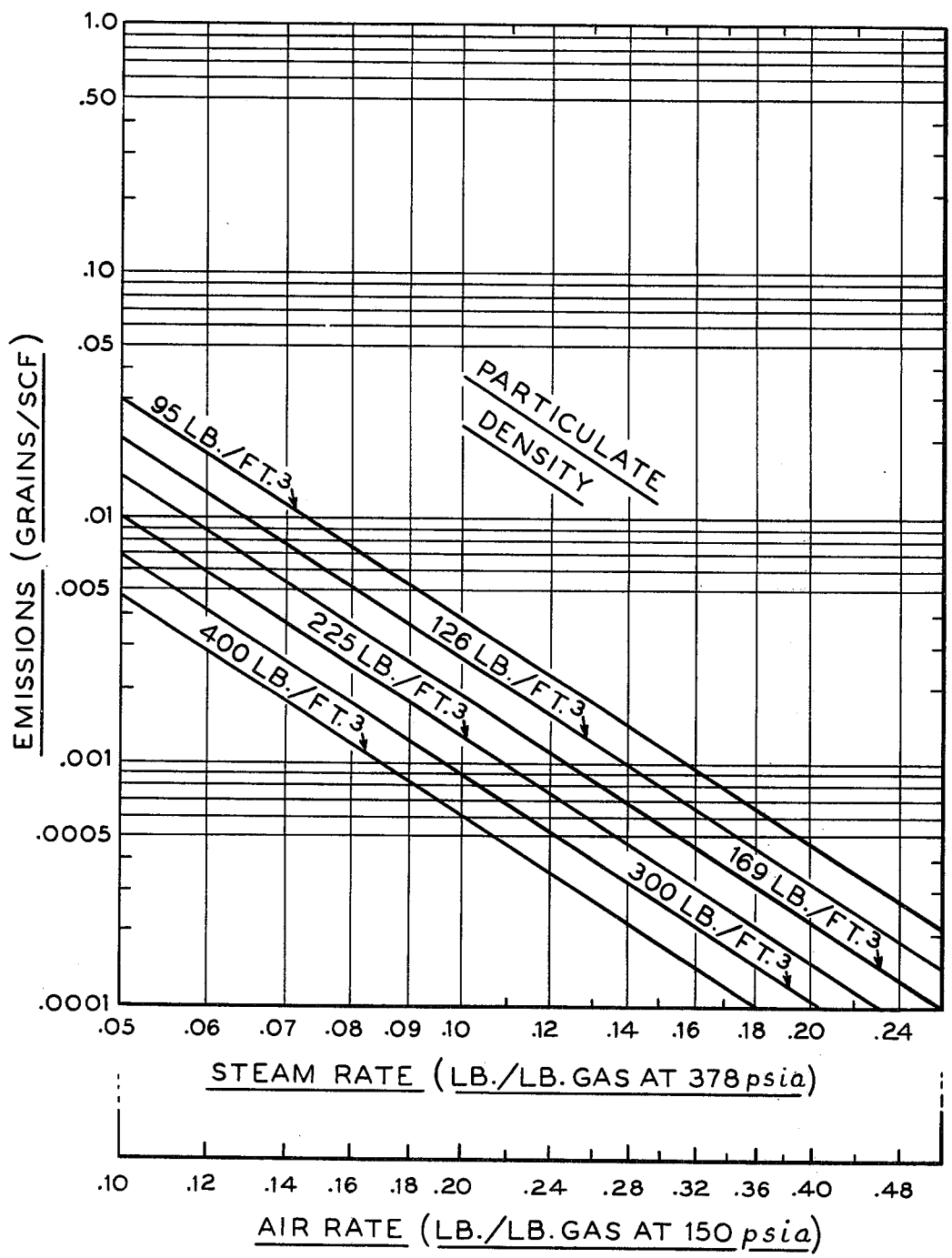
FIG. 21 is a family of curves showing the effect of particulate density on the relationship of the outlet emission level of the gas being treated and the input energy.

FIG. 21 shows the effect of particulate density in pounds per cubic foot on the outlet emission level of gas being treated. This figure shows that dense particulate is more easily removed than light particulate though the effect of density is not as pronounced as that of particulate wettability.

Figure 22:
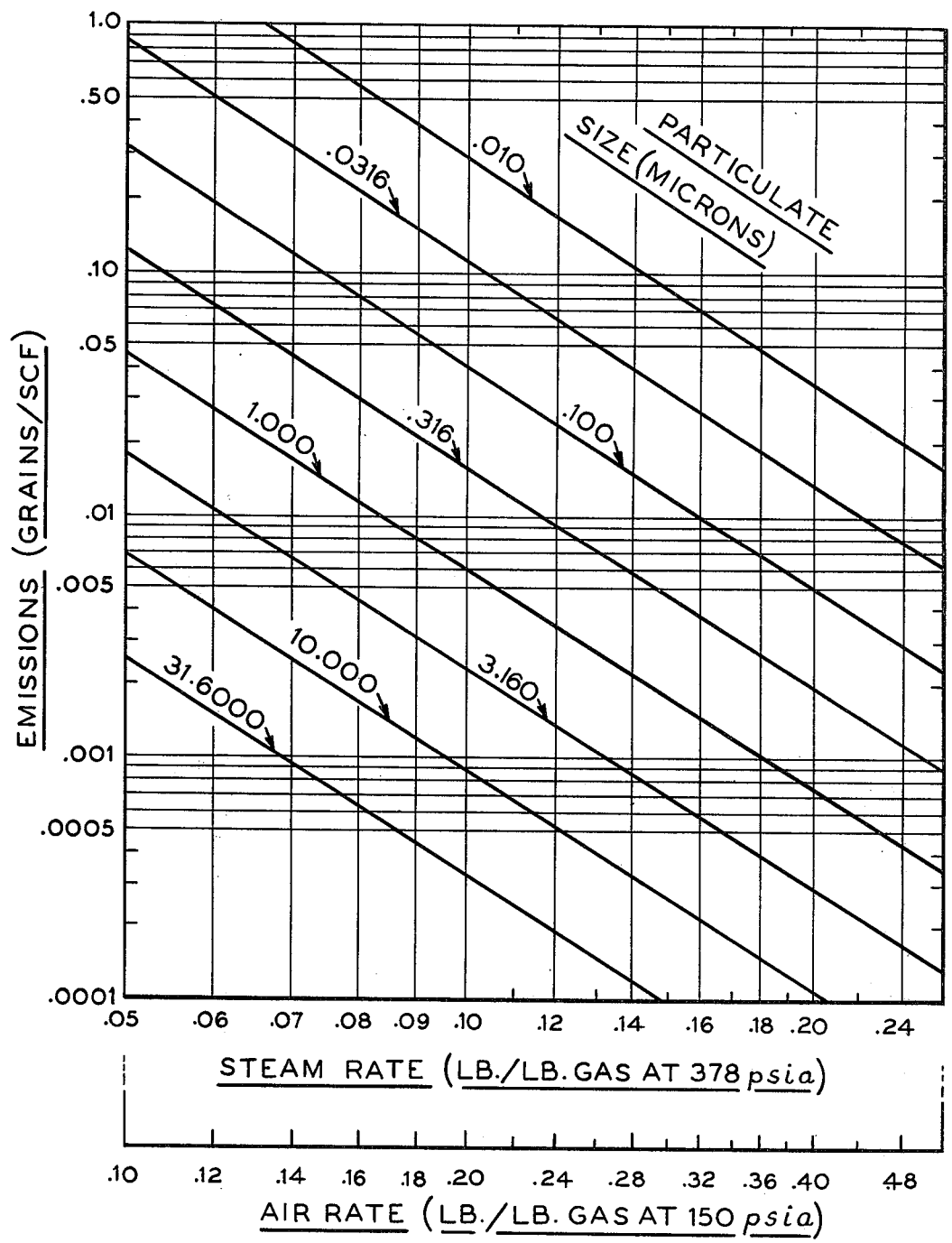
FIG. 22 is a family of curves showing the effect of particulate size on the relationship of the outlet emission level of the gas being treated and the input energy.

FIG. 22 relates the effect of particulate size in microns to the outlet emission level of the gas being treated. The effect of particulate size is intermediate that of wettability and density but is of significant importance. As set forth above, in applicants' equipment the particulate is encapsulated in water droplets which are then caused to increase to a size that can easily be removed through application of the flow separation principle. As a result of the efficient contacting and mixing component in applicants' apparatus, extremely fine particulate can be wetted and captured by fluid droplets provided that adequate energy is supplied. It is a characteristic of applicants' system that the energy requirement increases substantially uniformly as the particle size decreases. This characteristic distinguishes applicants' system from other wet scrubbing systems described above in which the energy requirements increase non-uniformly and in which particulate in the submicron size range cannot effectively be captured.

Figure 23:
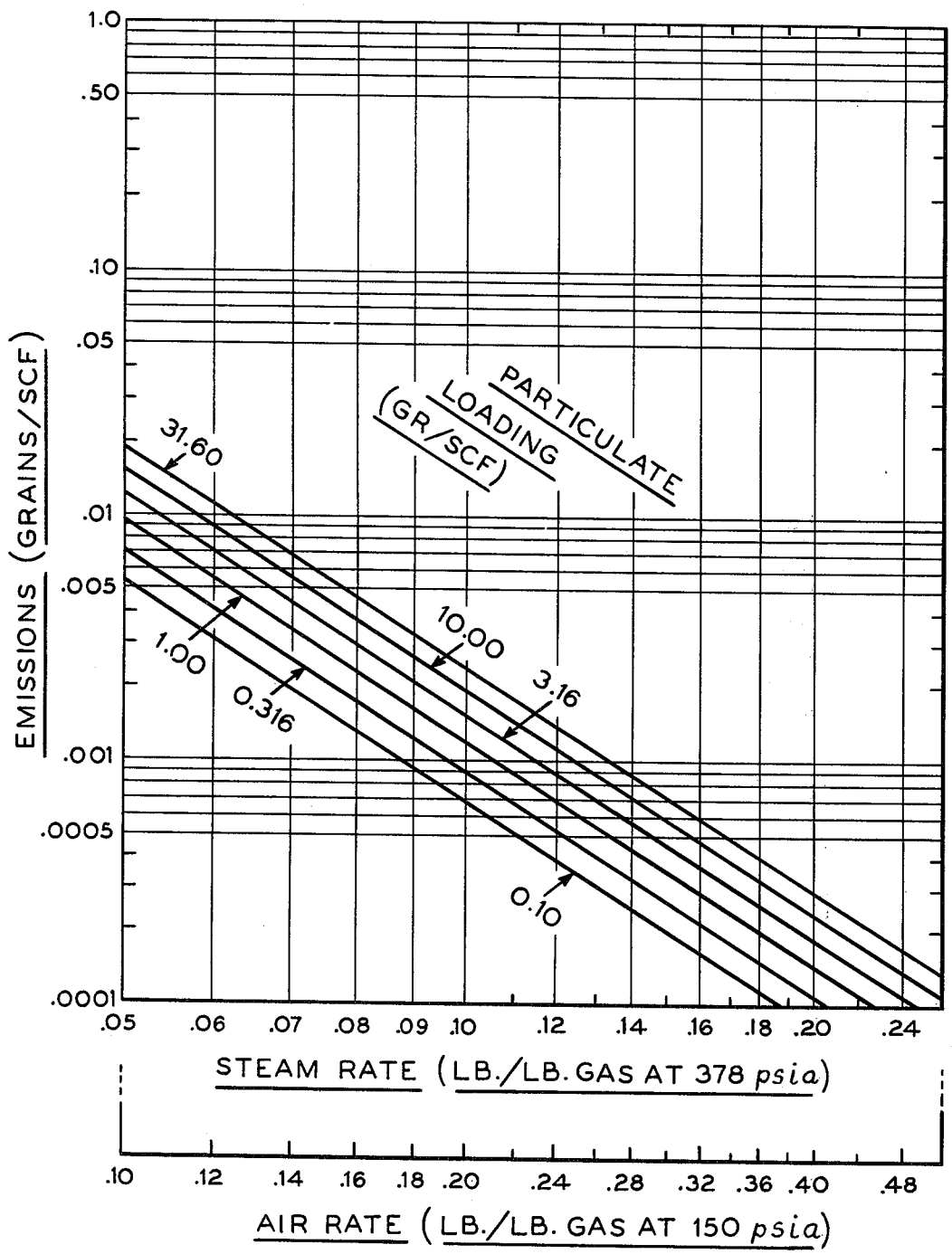
FIG. 23 is a family of curves showing the effect of particulate loading on the relationship of the outlet emission level of the gas being treated and the input energy.

FIG. 23 demonstrates the effect of particulate loading on the outlet emission level of the gas being treated. This effect is surprisingly limited in applicants' system and this also serves to distinguish applicants' system from the prior art scrubbing systems referred to above. Again, however, applicants are able to compensate for variations in particulate loading through a control in the input energy level.

Figure 24:
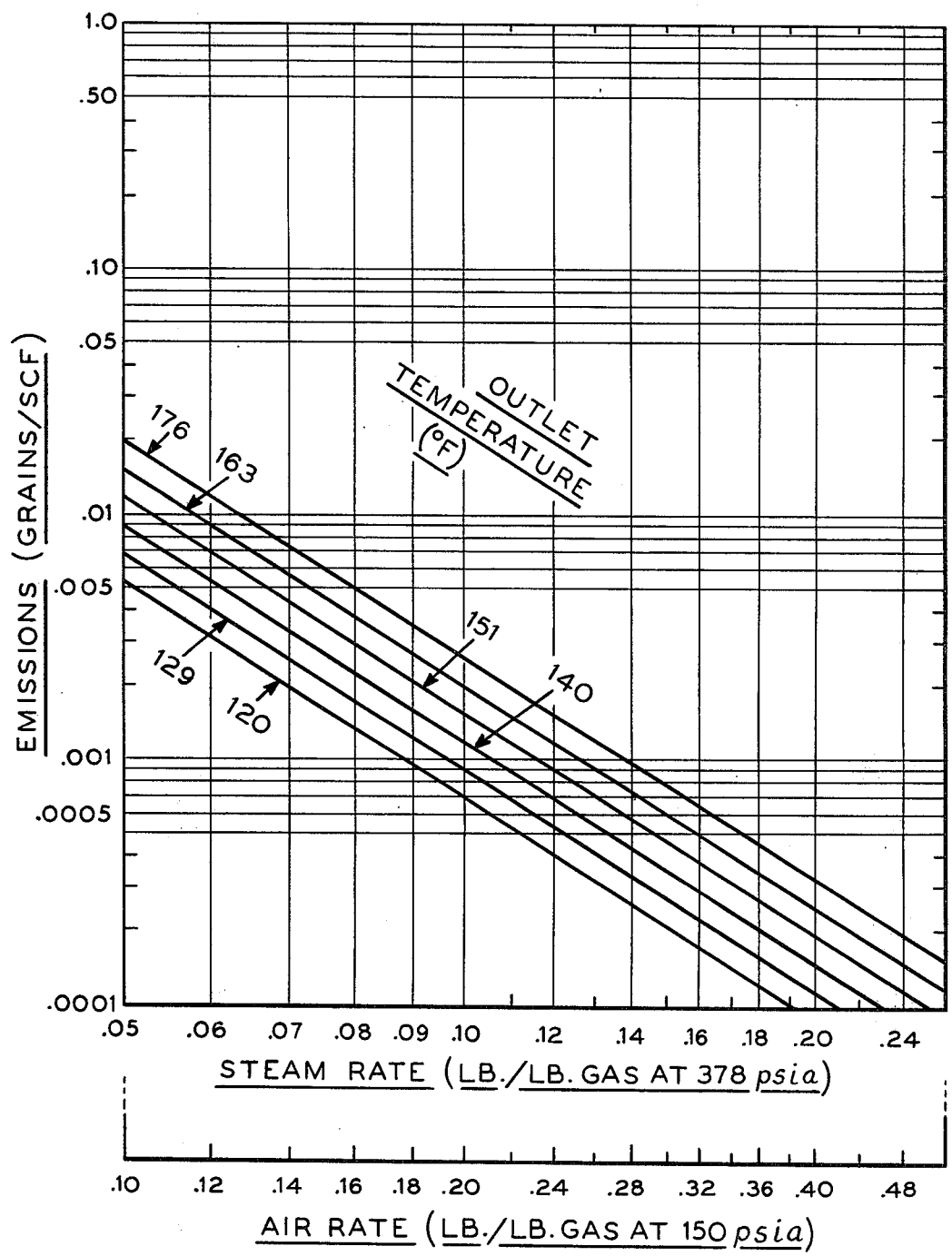
FIG. 24 is a family of curves showing the effect of the temperature of the outlet gas on the relationship of the outlet emission level of the gas being treated and the input energy.

FIG. 24 relates the effect of outlet gas temperature to the outlet emission level of the gas being treated. This figure demonstrates the advantage in energy consumption which may be attained by lowering the outlet temperature. It will be appreciated that where air is used as the driving fluid in place of steam, the operating temperatures will be substantially lower, although the total volume of gas passing through the system will be greater. A further advantage attributable to the lower temperature resulting from the use of air as a driving fluid appears in the reduced tendency to form a visible plume. Finally, it will be appreciated that when air (or another gaseous fluid) is utilized as the driving means, there will be a dilution effect on the outlet emission level measured on a unit volume basis.

Figure 25:
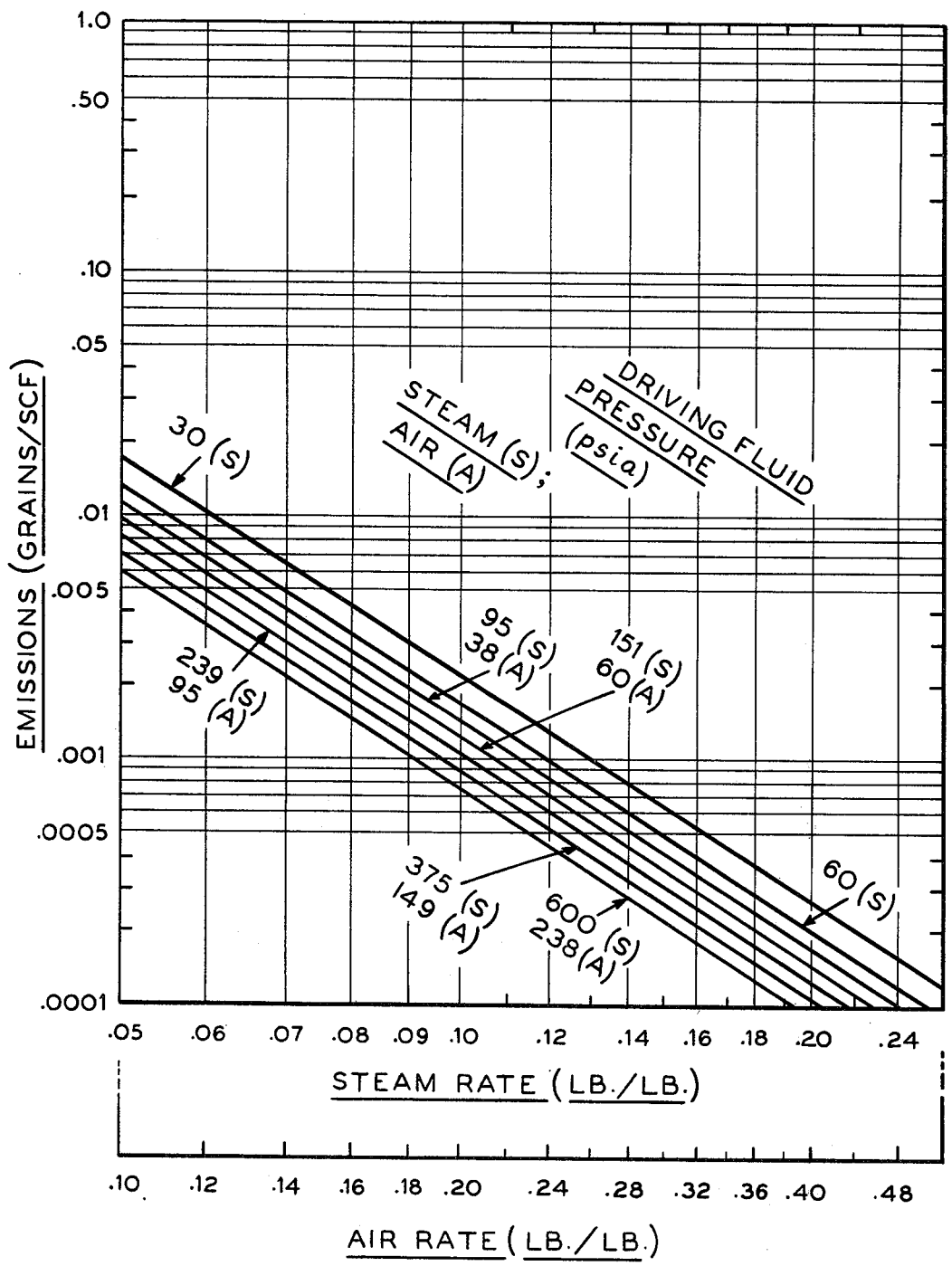
FIG. 25 is a family of curves showing the effect of the pressure of the driving fluid on the relationship of the outlet emission level of the gas being treated and the input energy.

FIG. 25 shows the effect of driving fluid pressure on the emission level of the gas being treated. This figure demonstrates both that relatively wide variations may be made in the driving fluid pressure and that less driving fluid is required when higher pressures are used. The choice both of driving fluid and operating pressure may thus depend upon the relative cost and availability of each type of driving fluid. Thus, for example, in a power plant low pressure waste steam may be available or there may be excess blower capacity providing an economical supply of low pressure air. On the other hand, electrical energy or high pressure steam turbines may be available to operate blowers to provide low pressure air. In each case, the decision both as to the type of driving fluid and the pressure of the driving fluid may be based upon the circumstances of the proposed installation.

Figure 26:
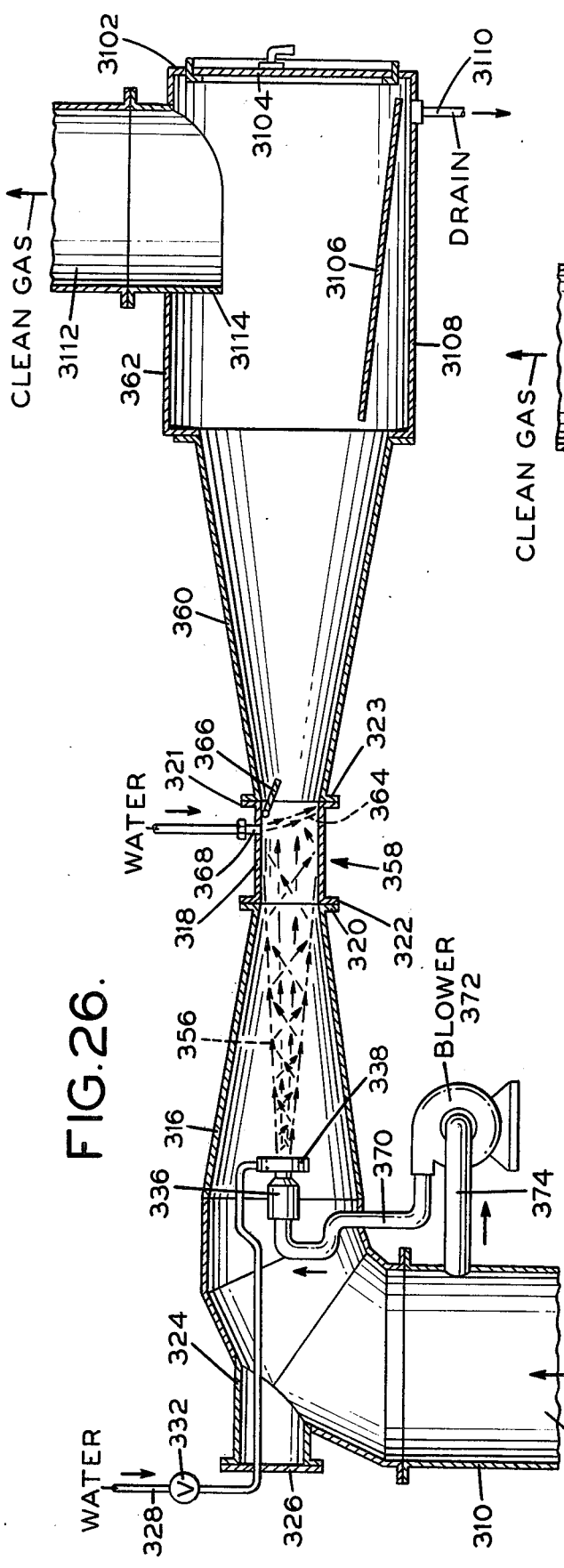
FIG. 26 is a vertical sectional view similar to FIG. 1 showing a modified form of apparatus embodying the present invention.

In FIG. 26 there is shown an embodiment of the present invention in which a part of the effluent polluted gas itself is used as the compressible fluid to form the ejector jet for driving the remainder of the incoming polluted gas through the mixing tube. The apparatus here shown is otherwise identical with that described above in connection with FIGS. 1, 2 and 16 and the various forms of fluid and mechanical restricting means for flow separation in the diffuser means described hereinabove may be used alone or together as explained above. For convenience and to avoid repetition of descriptive matter the reference numerals in FIG. 26 which are applied to parts identical with those in FIG. 1 are the same as those in FIG. 1 but preceded by the digit 3. Only a few of such reference numerals will be used in the description of FIG. 26.

In FIG. 26 the effluent polluted gas enters the conduit 310 and flows through elbow 316 to the mixing tube 318 and from the mixing tube 318 into the diffuser means 360. Either or both of the fluid restricting means 364 and mechanical restrictor 366 may be used to deflect the mixture of gas and cleaning fluid droplets away from the upper (as viewed in FIG. 26) inner diverging surface portion of diffuser means 360 toward the opposite inner diverging surface portion for separation of the water droplets from the cleaned gas, all as described above in connection with FIGS. 1, 2 and 16.

In FIG. 26 the ejector nozzle 336 is connected through a line 370 with a blower 372 the inlet of which is connected through a line 374 with the interior of the gas conduit 310. The blower 372 may be driven by a turbine or an electric motor as shown respectively in FIGS. 12 and 13. In this form of the invention a portion of the effluent polluted gas is drawn through the blower 372 and discharged through nozzle 336 in the form of a jet 356 which serves as an ejector in the same manner as the air ejector forms described above. The water or other cleaning fluid injector 338 may be of the form shown in FIG. 2 and thus surrounds the exit end of the ejector nozzle 336. The water or cleaning fluid is supplied, through a line 328 controlled by throttle valve 332, to the injector 338 from which it is injected in atomized form into the outer regions of the jet 356. The operations of pumping, particulate encapsulation, droplet growth and separation in the diffuser means 360 are all the same as heretofore described in connection with the several ejector driven devices embodying the present invention. The performance of this form of the invention is substantially identical with that achieved with the air-ejector forms described in connection with FIGS. 12 and 13.

Figure 27:
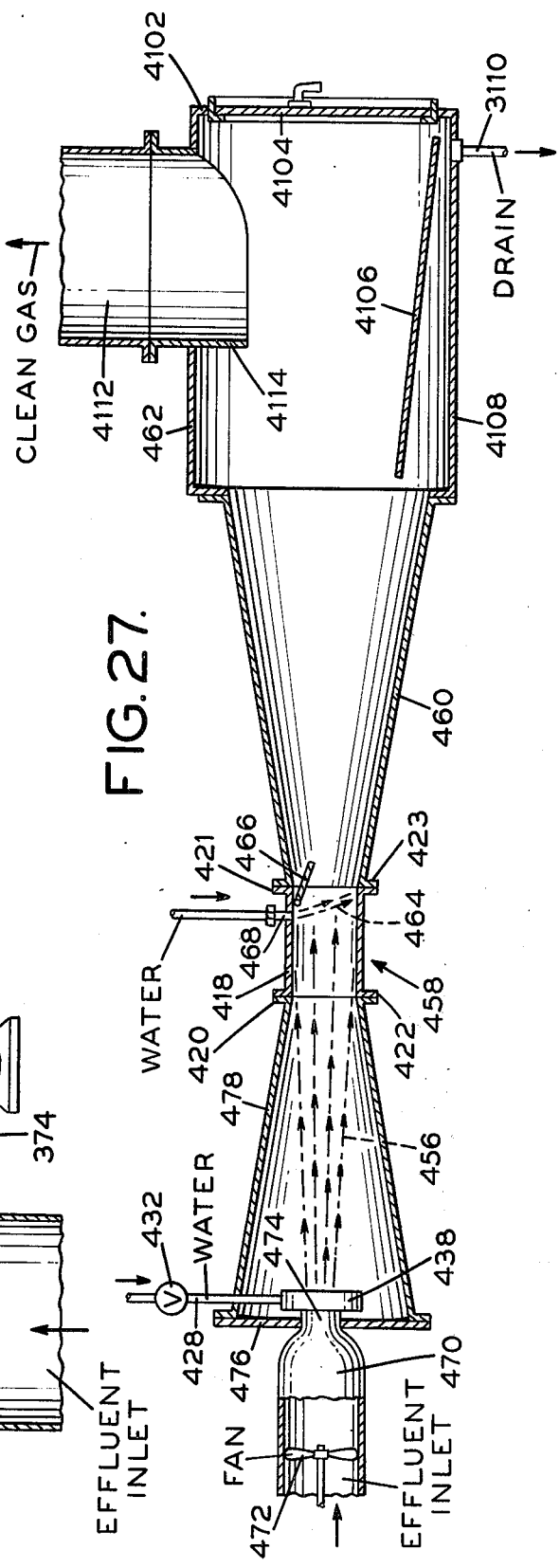
FIG. 27 is a vertical sectional view similar to FIG. 26 showing a further modified form of apparatus embodying the present invention.

In FIG. 27 a further modification of apparatus embodying the present invention is shown wherein all of the effluent polluted gas is formed into a jet and directed into the mixing tube means as a free jet without secondary gas flow. The water or other cleaning fluid is atomized and injected into the outer regions of this jet as it emerges from the nozzle in which the jet is formed. The jet is formed and the mixture of gas and water is driven through the mixing tube by a fan or blower. Except for these noted differences the structure shown in FIG. 27 is identical for illustrative purposes, with that described hereinabove in connection with FIGS. 1, 2 and 16. Parts in FIG. 27 which are identical with parts in the latter Figs. are identified by the same reference numerals preceded by the digit 4. Only a few of the reference numerals shown in FIG. 27 will be specifically referred to in the following description.

In FIG. 27 the full flow of effluent polluted gas is conducted through a conduit 470 by a fan or blower 472 and through a zone of decreasing cross section to a nozzle 474 which extends through a wall or bulkhead 476 which otherwise closes a chamber 478. The chamber 478 is preferably considerably larger in diameter at the closed end than the diameter of the nozzle 474 and the diameter of the chamber 478 progressively decreases to that of the mixing tube 418 at the point of connection of the chamber 478 with the mixing tube 418.

The jet 456 of compressible fluid, here the whole of the incoming polluted gas, is thus projected as a free jet from nozzle 474 through chamber 478 to the mixing tube 418. As is the case in all of the modifications disclosed above the water or other cleaning fluid is atomized and injected into the outer regions of the jet 456 by the injector 438 which is similar to that shown in FIG. 2. The water or other cleaning fluid is supplied to the injector through a line 428 and is controlled or regulated by the throttle valve 432.

In FIG. 27, the nozzle 474 need not be a converging-diverging or De Laval type since it is not proposed to form a jet 456 moving at supersonic speed. In practice the nozzle 474 may consist of a moderately tapered or choked passageway designed to discharge a conical jet of the gas involved which will expand within chamber 478 to a cross-sectional size such as to enter the mixing tube 418 without undue resistance to or interference with desired flow. Movement through mixing tube 418 and diffuser means 460 is the same as in any of the preceding embodiments.

Figure 28:
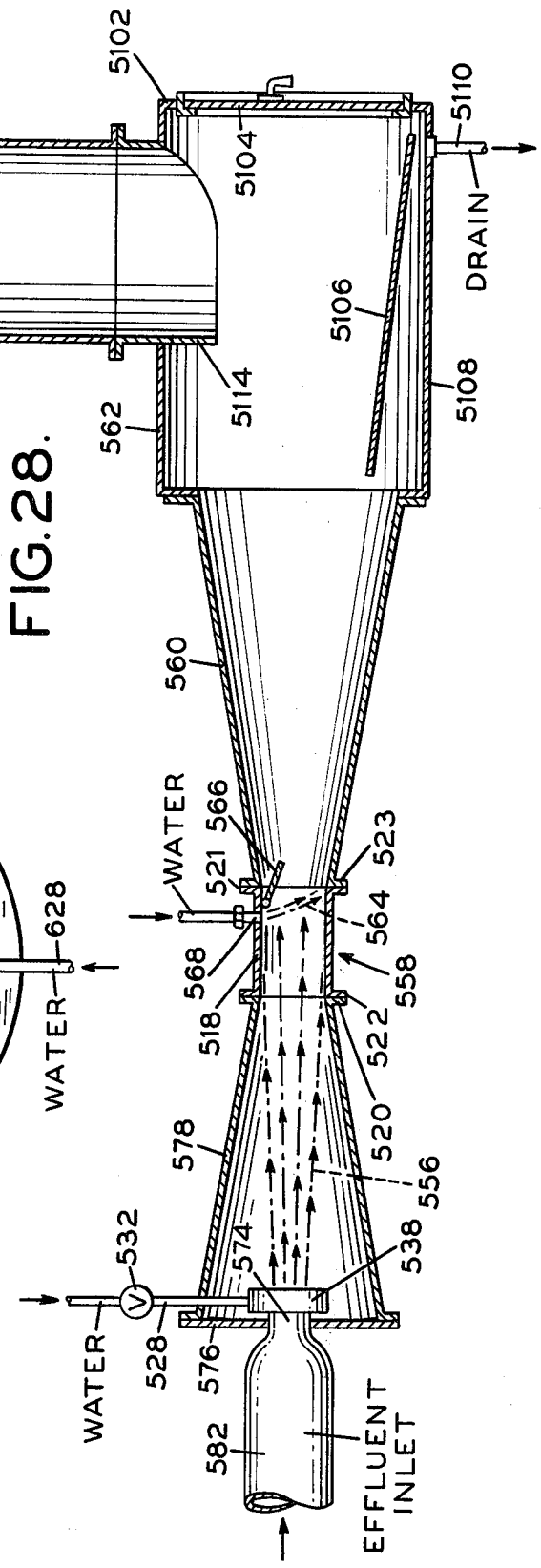
FIG. 28 is a vertical sectional view similar to FIG. 27 showing a still further modified form of apparatus embodying the present invention.

In FIG. 28 the apparatus is identical with that shown in FIG. 27 except that the fan or blower works as a suction device at the outlet stack instead of acting as a pressure device as it does in FIG. 27. Therefore, in FIG. 28 the reference numerals for parts identical with those in FIG. 27 are the same as in FIG. 27 but start with the digit 5 instead of the digit 4. Only a few of such reference numerals will be referred to in describing FIG. 28.

In FIG. 28 the whole of the effluent polluted gas stream is allowed to flow under such pressure as exists in the conduits through which it reaches the apparatus here shown towards a zone of lower pressure in the stack or other outlet of the diffuser means which is established by the suction fan or blower as mentioned above.

Thus, in FIG. 28, a suction fan or blower 580 is positioned in the stack 5112 to draw the polluted gas into a conduit 570 at the entry of the apparatus. Under the differential in pressure thus established the effluent polluted gas will flow through conduit 570 through nozzle 574 to form jet 556 to enter the mixing tube 518. The water or other cleaning fluid is supplied through line 528, controlled by throttle valve 532, to the injector 538 where it is atomized and injected into the outer regions of the free jet 556 as it emerges from nozzle 574 into chamber 578. The mixture of gas and water droplets then flows through mixing tube 518 and into diffuser means 560 under this differential in pressure and the mixing and separating functions proceed as in any of the preceding embodiments.

Figure 29:
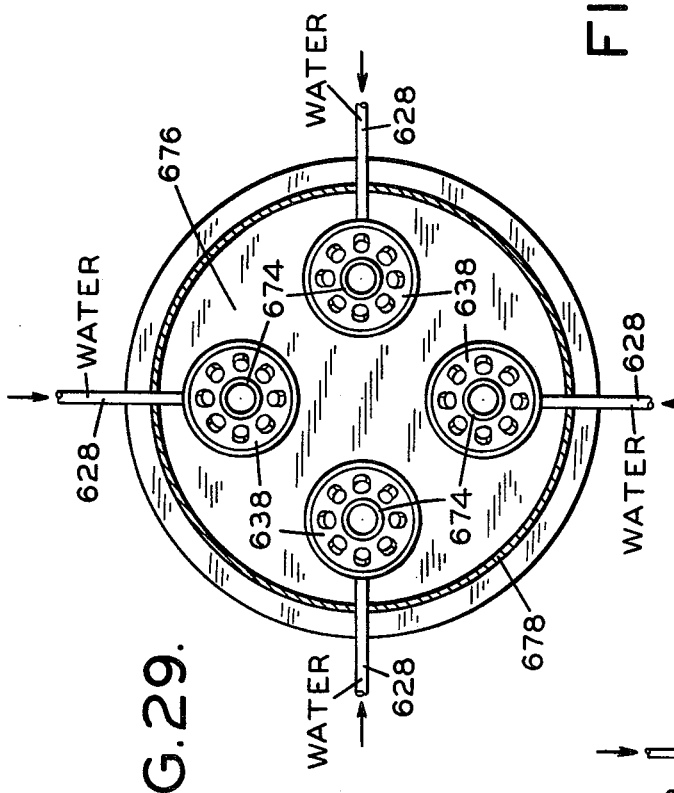
FIG. 29 is an interior elevational view looking towards the left in FIGS. 27 and 28 of a bulkhead providing a plurality of nozzles which optionally may be used in devices of the type shown in FIGS. 27 and 28.

In FIG. 29 there is shown an alternative multiple-nozzle arrangement which may be used in either of the devices shown in FIGS. 27 and 28. This view is an interior view looking towards the left as if a vertical section had been taken in a plane extending transversely of the enclosure 478 in FIGS. 27 or 578 in FIG. 28. However the bulkhead 676 in FIG. 29 is provided with a plurality of nozzles 674 each of which is provided with a water or other cleaning fluid injector 638. The bulkhead 676 is otherwise imperforate whereby the whole of the effluent polluted gas flowing from a source through suitable conduit means similar to the conduit 10 and elbow 16 in FIG. 1 will be divided between the plurality of nozzles 674 to form a corresponding number of free jets each directed within the enclosure 678 towards the mixing tube as is the case in the devices in FIGS. 27 and 28.

In FIG. 29 there are shown four nozzles 674 each with an injector 638. It will be understood that the plurality need not be limited to four and that two, three or more than four may be used where appropriate. The purpose of the plurality of nozzles 674 is that they may be used in any instance wherein the volume of polluted gas required to flow per unit of time through the apparatus is so great that a single nozzle as shown in FIGS. 27 and 28 might be impractically large in diameter for a desired velocity or where a single nozzle of practical diameter would accelerate the gas to a velocity above what is needed, with consequent waste of energy.

It will be apparent that each of the jets of polluted gas emerging from the plurality of nozzles 674 will have atomized water or other cleaning fluid injected into the outer regions thereof by the associated injector 638 thus to form the desired mixture of liquid droplets and polluted gas for flow through a mixing tube and into a diffuser means of any of the types disclosed in the several embodiments described hereinabove. The choice as to whether to use a single or a plurality of nozzles for a specific polluted gas is governed by a number of factors. As noted above there may be cases wherein the volumetric flow of polluted gas would require a nozzle of impractically large diameter. By this is meant that the large diameter nozzle will discharge a jet of correspondingly large diameter. Since the water or other cleaning fluid is injected into the outer regions of the jet it can be understood that there is a chance that the particulate matter flowing in the innermost regions of the large diameter jet might have adequate opportunity for contact with the shattered water droplets first formed in the outer regions of the jet. Thus, particularly when the particulate is made up of a large percentage of particles which are difficult or very difficult to wet (see FIG. 20) it has been found advisable to form several jets of relatively small diameter.

In summary with regard to the devices disclosed in FIGS. 27, 28 and 29 it is pointed out that devices such as these wherein the whole of the polluted gas stream is formed into a jet or a plurality of jets have been found to provide adequate cleaning, comparable with the results achieved by use of ejector drivers of the types shown in FIGS. 1, 12 and 13, for example, with substantially less energy requirements. The ejector is relatively low in efficiency from the standpoint of pumping, and requires the formation of pumping jets of high velocity, in some cases supersonic as pointed out above. In contrast with this the jets formed by fan or blower pressure or suction in the devices of FIGS. 27, 28 and 29 have two power requirement advantages over ejector pumps. First, the fan or blower is more efficient as a pump and second, the velocity of the jets need not be so high.

For example it has been found, with devices such as shown in FIGS. 27, 28 and 29 the jet velocity, at point of emergence from the nozzle need only to lie within the range of from about 100 to 300 feet per second when the particulate is of the wettable or easy to wet type (see FIG. 20). For particulate more difficult to wet the velocity may lie in the range from about 400 to 600 feet per second. Velocities not exceeding about 800 feet per second have been found adequate for the most difficult to wet particulate.

FIG. 30 presents a family of curves showing relative performance of the modified diffuser means of the present invention when the mixture of polluted gas and cleaning fluid droplets is driven through the mixing tube by the three major forms of driving means herein disclosed. For the steam ejector such as FIG. 1 or the air ejector of FIGS. 12 and 13 the cleaning results (in grains per standard cubic foot) collected at the outlet of the cleaned gas is plotted against the amount of ejector driving medium (in pounds of medium per pound of contaminated or polluted gas). For the fan or blower driven devices such as shown in FIGS. 27, 28 and 29 the cleaning results are plotted against the fan nozzle pressure (in inches of water). From FIG. 30 and a knowledge of the relative cost, in a particular plate or geographic location, of steam, air or power plus a knowledge of what degree of cleaning is required a selection may be made between the use of the ejector devices or the fan or blower driven devices herein disclosed. This, of course, is for a particular type of gas polluted or contaminated with a known substance. FIG. 30 presents results with the effluent gas from a recovery furnace in a paper mill making a sulphate pulp. Obviously similar curves can be prepared for use with polluted gases for any other type although in practice the results of extensive testing with various polluted gases may be entered into a computer along with a great amount of additional information whereby the essential values for design of a particular installation may be rapidly determined.

In summary of the entire disclosure herein it will be noted that the diffuser means with the fluid flow separator such as 64, 68 in FIG. 1 or the mechanical separator such as 66 in FIG. 1, or both, produces the separated flow of water droplets away from the flow of the gaseous components and thus separates the particulate encapsulated in those droplets from the gas to be cleaned. For such operation to be effective it must be assured that the polluted gas is adequately mixed with the cleaning water or other fluid and that the particulate has been captured in the water droplets before the mixture flows from the mixing tube into the diffuser. For this reason applicants form a compressible fluid into one or more free jets which emerge into a chamber and the cleaning water or other fluid is injected into the outer region of each jet. The water is atomized by the injector and is further atomized upon contact with the rapidly moving compressible fluid in the jet. Study of the action of the water as it enters the jet has revealed that the atomized droplets from the injector are flattened by the jet into non-spherical shapes which are not avoided by small particulate in the manner that particulate may avoid collision with spherical droplets. Obviously, these flattened shapes are successively shattered into smaller droplets which in turn are formed into smaller flattened shapes all of which are effective for capture of particulate. For this action to occur the velocity of the jet may be supersonic as it is in the steam or air ejector drivers disclosed hererin and in said U.S. Pat. No. 3,852,409, or it may be subsonic as it is in the devices disclosed herein in FIGS. 27, 28 and 29, where the compressible fluid is the whole of the polluted gas itself. The combination of such injecting and mixing devices with the special diffuser means herein disclosed is believed to provide the art with a novel, effective and highly economical apparatus and method for cleaning of polluted gas streams.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. In an apparatus for the removal of pollutant material comprising particulates from a polluted gas stream having mixing tube means having entry and exit ends, means for driving said polluted gas stream through said mixing tube means comprising nozzle means for forming a jet of compressible fluid such as steam or air or the whole or a part of the polluted gas itself and for directing said jet into said mixing tube means, and means for injecting an atomized liquid into the outer regions of said jet as it emerges from said nozzle means for forming a mixture comprising said gas stream and said injected liquid in the form of liquid droplets flowing through said mixing tube means, said mixture as it approaches the exit end of said mixing tube means comprising the liquid droplets encapsulating substantially all of the particulates initially contained in said stream of polluted gas; the improvement which comprises diffuser means having a gradually increasing cross-sectional area defined means having a gradually increasing cross-sectional area defined by an inner surface comprising opposed diverging first and second surface portions and communicating at the smaller end thereof with the exit end of said mixing tube means, and separating means located adjacent said smaller end of said diffuser means to deflect the mixture flowing therethrough away from said first diverging surface portion of said inner surface of said diffuser means and to direct said mixture toward said second diverging surface portion of said inner surface of said diffuser means.

2. An apparatus as described in claim 1 in which said separating means comprises a fluid curtain emitted from at least one nozzle.

3. An apparatus as described in claim 1 in which said separating means comprises a curtain of liquid droplets emitted from at least one nozzle.

4. An apparatus as described in claim 1 in which said separating means comprises a curtain of liquid droplets emitted from at least one atomizing nozzle.

5. An apparatus as described in claim 1 in which said separating means comprises a plate.

6. An apparatus as described in claim 5 in which said plate is movable.

7. An apparatus as described in claim 5 in which said plate is mounted for oscillatory motion about an axis perpendicular to a plane containing the axial centerline of said diffuser means.

8. An apparatus as described in claim 1 in which said separating means comprises a curtain of liquid droplets emitted from at least one nozzle, and a plate.

9. An appartus as described in claim 1 in which there is provided tailpipe means, having upper and lower portions and communicating with the larger end of said diffuser means; a gas discharge port formed in the upper portion of said tailpipe means; a liquid drain formed in the lower portion of said tailpipe means; and baffle means located adjacent said gas discharge port within the upper portion of said tailpipe mean.

10. In an apparatus for the removal of pollutant material comprising particulates from a polluted gas stream having mixing tube means having entry and exit ends, means for driving said polluted gas stream through said mixing tube means comprising nozzle means for forming a jet of compressible fluid such as steam or air or the whole or a part of the polluted gas itself and for directing said jet into said mixing tube means, and means for injecting an atomized liquid into the outer regions of said jet as it emerges from said nozzle means for forming a mixture comprising said gas stream and said injected liquid in the form of liquid droplets flowing through said mixing tube means, said mixture as it approaches the exit end of said mixing tube means comprising the liquid droplets encapsulating substantially all of the particulates initially contained in said stream of polluted gas; the improvement which comprises diffuser means having a gradually increasing cross-sectional area defined by a divergent inner surface comprising first and second portions and communicating at the smaller end thereof with the exit end of said mixing tube means; and separating means located in said mixing tube means to cause the mixture flowing through said mixing tube means and said diffuser means to separate from said first portion of said divergent inner surface of said diffuser means and be directed toward said second portion of said divergent inner surface of said diffuser means.

11. An appartus as described in claim 10 in which said separating means is located adjacent the exit end of said mixing tube means.

12. An apparatus as described in claim 10 in which said separating means comprises a fluid curtain emitted from at least one nozzle mounted in said mixing tube means.

13. An apparatus as described in claim 10 in which said separating means comprises a curtain of liquid droplets emitted from at least one nozzle mounted in said mixing tube means.

14. An apparatus as described in claim 13 in which said separating means comprises a curtain of liquid droplets emitted from at least one atomizing nozzle mounted in said mixing tube means.

15. An appartus as described in claim 10 in which said separating means comprises a plate which subtends a portion of the interior cross-sectional area of said mixing tube means.

16. An apparatus as described in claim 15 in which said plate is movable so as to subtend a variable portion of the interior cross-sectional area of said mixing tube means.

17. An apparatus as described in claim 15 in which said plate is mounted for oscillatory motion about an axis perpendicular to a plane containing the axial centerline of said mixing tube means.

18. An appartus as described in claim 10 in which said separating means comprises a curtain of liquid droplets emitted from at least one nozzle mounted in said mixing tube means and a plate which subtends a portion of the interior cross-sectional area of said mixing tube means.

19. An apparatus as described in claim 10 in which there is provided tailpipe means, having upper and lower portions and communicating with the larger end of said diffuser means; a gas discharge port formed in the upper portion of said tailpipe means; a liquid drain formed in the lower portion of said tailpipe means; and baffle means located adjacent said gas discharge port within the upper portion of said tailpipe means.

20. In a process for the removal of pollutant material comprising particulates from a polluted gas which includes driving a stream of said polluted gas through a mixing tube by forming and discharging from a nozzle means a jet of pressurized compressible fluid such as steam or air or the whole or a part of the polluted gas itself directed into the mixing tube, forming a series of jet sprays of liquid in a first atomized condition disposed circumferentially about said jet of compressible fluid, further atomizing said liquid by directing said jet sprays into the outer region of said jet of compressible fluid as it emerges from said nozzle means for forming a mixture comprising said polluted gas and said liquid in the form of further atomized droplets flowing through said mixing tube, said mixture as it approaches the exit end of said mixing tube comprising the liquid droplets encapsulating substantially all of the particulates initially contained in said stream of polluted gas; the improvement which comprises directing said mixture containing said droplets from said mixing tube into a diffuser having gradually increasing cross-sectional area defined by an inner surface comprising opposed diverging surface portions, deflecting the flow of said mixture as it enters said diffuser away from one of said opposed diverging surface portions of said diffuser and toward the other of said opposed diverging surface portions to cause deentrainment of said droplets from said mixture.

21. A process in accordance with claim 20 in which said deflecting of the flow of said mixture as it enters said diffuser is effected by forming a curtain of fluid material directed transversely into the path of flow of said mixture.

22. A process in accordance with claim 21 in which said curtain of fluid material is a curtain of liquid droplets.

23. A process in accordance with claim 20 in which said deflecting of the flow of said mixture as it enters said diffuser is effected by interposing a plate to intercept the flow of a portion of said mixture.

24. A process in accordance with claim 20 in which said deflecting of the flow of said mixture as it enters said diffuser is effected both by forming a curtain of fluid material directed transversely into the path of flow of said mixture and by interposing a plate adjacent said fluid curtain to intercept the flow of a portion of said mixture.

* * * * *

UNITED STATES PATENT AND TRADEMARK OFFICE
CERTIFICATE OF CORRECTION

PATENT NO. : 4,141,701

DATED : February 27, 1979

INVENTOR(S) : Thomas K. Ewan, et al.

It is certified that error appears in the above-identified patent and that said Letters Patent are hereby corrected as shown below:

Col. 4, line 54, "hotwater" should be --hot water--

Col. 17, line 30, ".098" should be --.104--

Col. 19, line 63, "along" should be --alone--

Col. 21, line 36, "143" should be --143'--

Col. 29, line 13, "hererin" should be --herein--

Col. 29, lines 47 and 48,, Delete "means having a gradually increasing cross-sectional area defined" second occurence

UNITED STATES PATENT AND TRADEMARK OFFICE
CERTIFICATE OF CORRECTION

PATENT NO. : 4,141,701
DATED : February 27, 1979
INVENTOR(S) : Thomas K. Ewan, et al.

It is certified that error appears in the above-identified patent and that said Letters Patent are hereby corrected as shown below:

Col. 30, line 18, "mean" should be --means--

Col. 30, line 61, "appartus" should be --apparatus--

Col. 31, line 5, "appartus" should be --apparatus--

Signed and Sealed this

Seventeenth Day of July 1979

[SEAL]

Attest:

LUTRELLE F. PARKER

*Attesting Officer*     *Acting Commissioner of Patents and Trademarks*